(12) United States Patent
Negishi et al.

(10) Patent No.: US 7,773,847 B2
(45) Date of Patent: Aug. 10, 2010

(54) MULTIMODE OPTICAL FIBER

(75) Inventors: Kazuaki Negishi, Kanagawa (JP); Yasushi Koyano, Kanagawa (JP); Itaru Sakabe, Kanagawa (JP); Masahiko Matsui, Kanagawa (JP); Masashi Onishi, Kanagawa (JP); Tetsuya Nakanishi, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 362 days.

(21) Appl. No.: 11/413,050

(22) Filed: Apr. 28, 2006

(65) Prior Publication Data

US 2006/0263019 A1    Nov. 23, 2006

Related U.S. Application Data

(60) Provisional application No. 60/676,306, filed on May 2, 2005.

(30) Foreign Application Priority Data

Apr. 28, 2005   (JP)   ............... P2005-133748

(51) Int. Cl.
    *G02B 6/036* (2006.01)
(52) U.S. Cl. ..................................... 385/127
(58) Field of Classification Search ................. 385/127
    See application file for complete search history.

(56) References Cited

U.S. PATENT DOCUMENTS 4,974,932  A  *  12/1990  Nattermann et al. ......... 385/124

FOREIGN PATENT DOCUMENTS

| JP | 63-208003 | 8/1988 |
| JP | 11-064665 | 3/1999 |
| JP | 2005-037608 | 2/2005 |

OTHER PUBLICATIONS

Dazai, M., et al. "Development of Radiation Resistant Multi-Fiber Optical Cable Incorporating Graded Index Type Fibers" Proceedings of 33rd International Wire and Cable Symposium Nov. 13-15, 1984, Reno, Nevada.
Kanamori, H,. et al. "Transmission Characteristics and Reliability of Pure Silica-Core Single-Mode Fibers" Journal of Lightwave Technology, vol. LT-4, No. 8, pp. 1144-1150.
Japanese Office Action, w/ English translation thereof, issued in Japanese Patent Application No. JP 2005-133748 dated Jun. 30, 2009.
Japanese Office Action, with English translation, issued in Japanese Patent Application No. 2005-133748, mailed Nov. 17, 2009.

* cited by examiner

*Primary Examiner*—Jerry T Rahll
(74) *Attorney, Agent, or Firm*—McDermott Will & Emery LLP

(57) ABSTRACT

A core part of a multimode optical fiber including the core part and a cladding part has a structure composed of a plurality of concentric layers in which a refractive index is decreased stepwise from a first core layer as an innermost layer to a third core layer as an outermost layer. The structure having the plurality of layers is formed by adjusting a quantity of addition of fluorine to silica glass. Fluorine is added to the cladding part so that a refractive index is lower than that of the third core layer as the outermost layer of the core part.

8 Claims, 15 Drawing Sheets

MULTIMODE OPTICAL FIBER

RELATED APPLICATIONS

This application claims the benefit of Japanese Application No. 2005-133748, filed on Apr. 28, 2005 and U.S. Provisional Patent Application No. 60/676,306, filed on May 2, 2005, the disclosures of which Applications are incorporated by reference herein.

BACKGROUND OF THE INVENTION

1. Technical Field

The present invention relates to a multimode optical fiber having a core part and a cladding part.

2. Related Art

In a multimode optical fiber for transmitting optical signals of a plurality of modes to a core part, a refractive index profile thereof is roughly classified into two kinds including a step index (SI) type and a graded index (GI) type. The optical fiber of the GI type thereof has an αth power type refractive index profile in which the central part of a core has the highest refractive index and a refractive index is gradually lowered toward the outward position in the radial direction so that a delay time difference between the modes for transmitting the optical signals is suppressed to a low level as much as possible.

The optical fiber of the GI type ordinarily includes germanium (Ge) as a refractive index adjusting additive for raising the refractive index of glass. A quantity of the germanium (Ge) is gradually increased toward the center from the outer edge of the core part.

Further, it has been considered to use a multimode optical fiber of the GI type including fluorine (F) as a refractive index adjusting additive for lowering the refractive index of glass. A quantity of the fluorine is gradually increased toward the outward position in the radial direction from a center (see non-Patent Document 1).

Further, it has been known to use a single mode optical fiber in which a core is composed of pure silica glass and fluorine is added to a cladding to lower a refractive index (for instance, see non-Patent Document 2). This optical fiber is called a pure silica core fiber (Z fiber) and has hydrogen resistant characteristics, radiation resistant characteristics and low attenuation characteristics.

[Non-Patent Document 1] International Wire & Cable Symposium Proceedings 1984 (244 to 250 pages)

[Non-Patent Document 2] Lightwave Technology, Vol LT-4, No. 8

When submarine resources are searched, a temperature is measured by a Fiber-Optic Distributed Temperature Sensing System (DTS) using the multimode optical fiber of the GI type. In this measuring method, lights to be measured are allowed to be incident on the installed optical fiber to detect the intensity ratio for Stokes' lights and anti-Stokes' lights of Raman scattered lights returning to an incident end, so that the temperature at a measuring position is measured based on a measuring time.

In such a measurement of temperature, when the optical fiber including germanium in a core to adjust a refractive index is used, since attenuation is increased by hydrogen in the submarine resources, a highly accurate measurement cannot be carried out. For instance, when the attenuation is increased by the hydrogen in a wavelength band of around 1400 nm, the influence of the increase of the attenuation is also given to the anti-Strokes' lights (1455 nm) and thereby generates a difference in increase of the attenuation from that of the Stokes' lights (1633 nm) apart from the 1400 nm band. The difference in increase of the attenuation causes the temperature detecting accuracy of the DTS to be deteriorated.

It has been known to use the optical fiber in which the surface of the multimode optical fiber of the GI type with germanium added to the core is coated with carbon to prevent the entry of hydrogen. However, in this optical fiber, under an environment of high temperature (for instance, 120° C. or higher), the entry of hydrogen cannot be prevented.

As compared therewith, in the optical fiber which is disclosed in the non-Patent Document 1 and has fluorine added to the core and the cladding, the increase of the attenuation by hydrogen does not arise, so that a highly accurate measurement can be achieved. However, it has been extremely difficult to continuously change the quantity of the fluorine in the radial direction to form an αth power type refractive index profile with good accuracy.

In the single mode fiber (pure silica core fiber) disclosed in the non-Patent Document 2, since the diameter of the core is small, a light having a large power cannot be inputted. Further, a numerical aperture NA is small, the probability of capture of the Raman scattered lights is reduced to lower an S/N and deteriorate the temperature detecting accuracy of the DTS. If the incident power is increased, an inductive Raman scattering is caused to deteriorate the S/N and the lights cannot be transmitted thereby.

SUMMARY OF THE INVENTION

It is an object of the present invention to provide a multimode optical fiber that can be easily produced and does not cause the increase of attenuation by hydrogen.

However, the present invention need not achieve the above object, and other objects not described herein may also be achieved. Further, the invention may achieve no disclosed objects without affecting the scope of the invention.

A multimode optical fiber that can solve the above-described problems is a multimode optical fiber having a core part and a cladding part, and characterized in that the core part has a structure including a plurality of concentric layers in which a refractive index changes stepwise respectively for the layers so as to be higher toward a central area and a quantity of addition of fluorine to silica glass is adjusted so as to be entirely increased toward an outer layer.

Further, in the multimode optical fiber according to the present invention, in the refractive index profile of the core part, when the central part and an end part in the radial direction of the core part are allowed to satisfy a below-described expression (1) as an ideal refractive index profile, at least one layer except a central layer of the layers preferably comes into contact with or intersects the ideal refractive index profile of the expression (1).

$$n(r) n1\{1-2\Delta(r/a)^\alpha\}^{1/2}, \quad 20 \leq \alpha \leq 2.1 \tag{1}$$

Here, n designates a refractive index difference, n1 designates a refractive index of the center of the core, Δ designates a relative refractive index difference, a designates a radius of the core, r designates a distance from the center of the core and α designates a coefficient of refractive index profile.

Further, in the multimode optical fiber according to the present invention, all the layers of the core part preferably come into contact with or intersect the ideal refractive index profile of the expression (1).

Further, in the multimode optical fiber according to the present invention, the number M of the layers of the core part is preferably located within a range of $3 \leq M \leq 20$.

Further, in the multimode optical fiber according to the present invention, the increase of attenuation is preferably not higher than 0.2 dB/km in a wavelength area of a range not lower than 800 nm and not higher than 1700 nm after the elapse of 300 hours in an atmosphere of hydrogen of 2 atm and under an environment of 150° C.

A multimode optical fiber according to the present invention that can solve the above-described problems is characterized in that the increase of attenuation is preferably not higher than 0.2 dB/km in a wavelength area of a range not lower than 800 nm and not higher than 1700 nm after the elapse of 300 hours in an atmosphere of hydrogen of 2 atm and under an environment of 150° C.

In the multimode optical fiber according to the present invention, a numerical aperture NA is preferably not lower than 0.18.

In the multimode optical fiber according to the present invention, a bandwidth is preferably not lower than 200 MHz km.

In the multimode optical fiber of the present invention, since the core part has a structure including a plurality of concentric layers in which a refractive index changes stepwise respectively for the layers so as to be higher toward a central area, the refractive index profile does not need to be highly accurately and continuously changed, a production is easy and the refractive index profile approximate to the $\alpha$th power type can be obtained. Accordingly, transmission characteristics close to the multimode optical fiber of the GI type can be obtained. Further, since the refractive index profile of the layered structure is formed by adding fluorine, the increase of the attenuation due to the influence of hydrogen is more reduced than that of the optical fiber to which germanium is added.

DETAILED DESCRIPTION OF THE INVENTION

Figure 1:
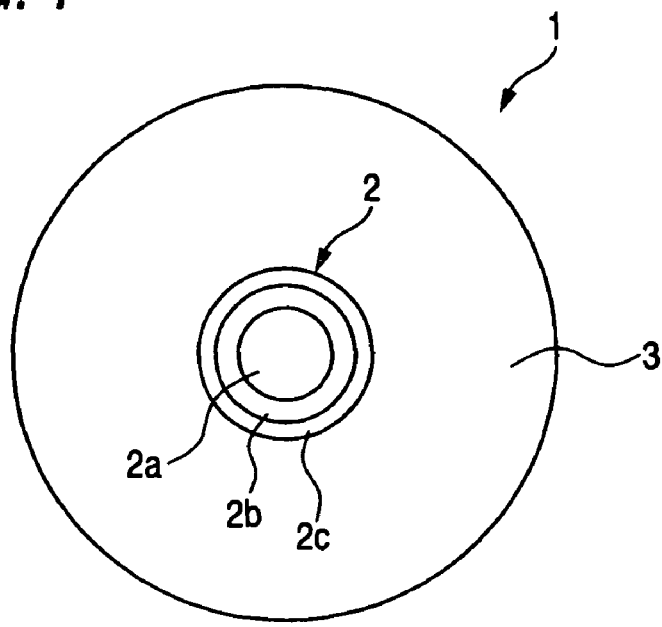
FIG. 1 is a sectional view showing one embodiment of an optical fiber according to the present invention.

Now, an embodiment of a multimode optical fiber according to the present invention will be described below by referring to the drawings.

Figure 2:
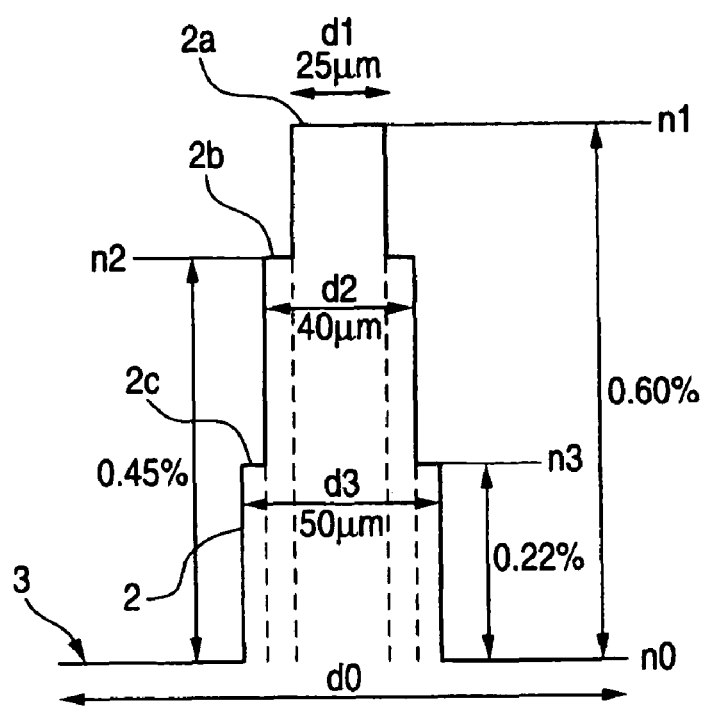
FIG. 2 is a schematic view showing a refractive index profile of the optical fiber shown in FIG. 1.

FIG. 1 is a sectional view of an optical fiber of this embodiment FIG. 2 is a schematic diagram showing the refractive index profile of the optical fiber.

As shown in FIG. 1, the optical fiber 1 has a core part 2 in a center and a cladding part 3 in the periphery thereof. Further, the core part 2 has a structure composed of a plurality of layers from a first core layer 2a in the center to a second core layer 2b and a third core layer 2c located at the outward position in the radial direction (herein, as one example, three layers).

Then, in the core part 2, a quantity of addition of fluorine to pure silica glass is adjusted so that the refractive index of each of the core layers 2a, 2b and 2c is adjusted. Further, fluorine is added to the cladding part 3 so that the refractive index of the cladding part 3 is lower than that of the third core layer 2c as the outermost layer of the core part 2. In this embodiment, chlorine is included in the core layer 2a in a process of a production.

As one example of a specific refractive index profile, as shown in FIG. 2, relative refractive index differences of the refractive indexes n1, n2 and n3 of the core layers 2a, 2b and 2c relative to the refractive index n0 of the cladding part 3 are respectively 0.60% in the first core layer 2a, 0.45% in the second core layer 2b and 0.22% in the third core layer 2c. Herein, the relative refractive index difference of the refractive index of the core layer relative to the refractive index of the cladding part is a ratio of the refractive index difference between the refractive indexes of the core layer and the cladding part with respect to the refractive index of the cladding part. In other words, the relative refractive index difference of the refractive index of the core layer relative to the refractive index of the cladding part is calculated by dividing the refractive index difference between the refractive indexes of the core layer and the cladding part by the refractive index of the cladding part.

That is, the core part 2 has a structure including a plurality of concentric layers in which the refractive index changes stepwise respectively for the layers so as to be higher toward a central area and a quantity of addition of fluorine to the silica glass is adjusted so as to be entirely increased toward an outer layer. The refractive index is reduced stepwise from the innermost layer to the outermost layer in the core part, however, the present invention also includes a core part having a layer whose refractive index is slightly increased between the innermost layer and the outermost layer.

Further, as one example of the specific size of the respective parts, a diameter d1 of the first core layer 2a of the core part 2 is 25 μm, a diameter d2 of the second core layer 2b is 40 μm, a diameter d3 of the third core layer 2c is 50 μm and a diameter d0 of the cladding part 3 is 125 μm.

When the optical fiber 1 has the above-described exemplified structure, the optical fiber has a bandwidth of 260 MHz·km and serves as a multimode optical fiber having good transmitting characteristics for measuring a temperature.

Further, each refractive index difference of the refractive indexes n1, n2, n3 and n0 of the core layers 2a, 2b, and 2c and the cladding part 3 is preferably set to an average value that is obtained by $\Delta ni=\Delta n/M$ when it is assumed that the refractive index difference between the cladding part 3 and the first core layer 2a is $\Delta n$ and the number of the layers of the core part 2 is M. However, the refractive index difference is not necessarily the average value and layers having values smaller or larger than the average value may be provided. In order to obtain the transmitting characteristics close to the refractive index profile of the multimode optical fiber of a GI type, the refractive indexes and diameters of the layers may be respectively ideally set so as to be approximated to an αth power type refractive index profile.

Namely, in the refractive index profile of the core part 2, when the central part (the center of the core layer 2a) and an end part (an outer edge of the core layer 2c) in the radial direction of the core part are allowed to satisfy a below-described expression (1) as an ideal αth power type refractive index profile, at least one layer of the core layers 2b and 2c except the first core layer 2a as the center preferably comes into contact with or intersects the ideal refractive index profile of the expression (1).

$$n(r)=n1\{1-2\Delta(r/a)^\alpha\}^{1/2}, 2.0 \leq \alpha \leq 2.1 \quad (1)$$

Here, n designates a refractive index difference, n1 designates a refractive index of the center of the core, Δ designates a relative refractive index difference, a designates a radius of the core, r designates a distance from the center of the core and α designates a coefficient of refractive index profile. Further, all the core layers 2b and 2c preferably come into contact with or intersect the ideal refractive index profile of the expression (1).

As a matter of course, the core layer 2a at the center comes into contact with the ideal αth power type refractive index profile.

Figure 3:
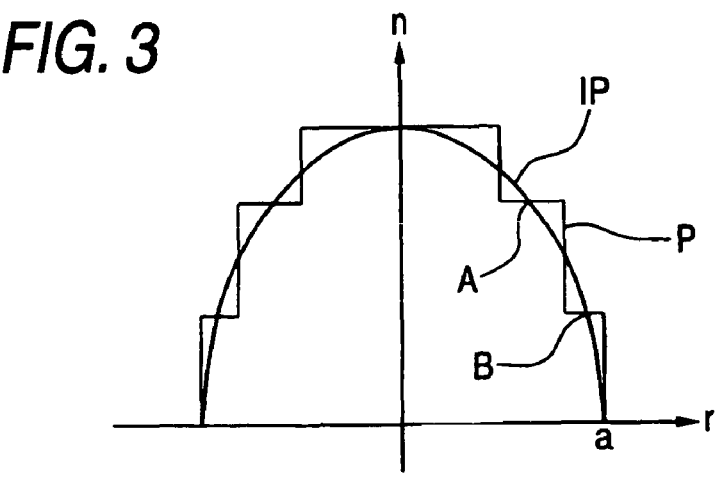
FIG. 3 is a schematic view showing one example of a refractive index profile of a core part together with an ideal refractive index profile.
Figure 4:
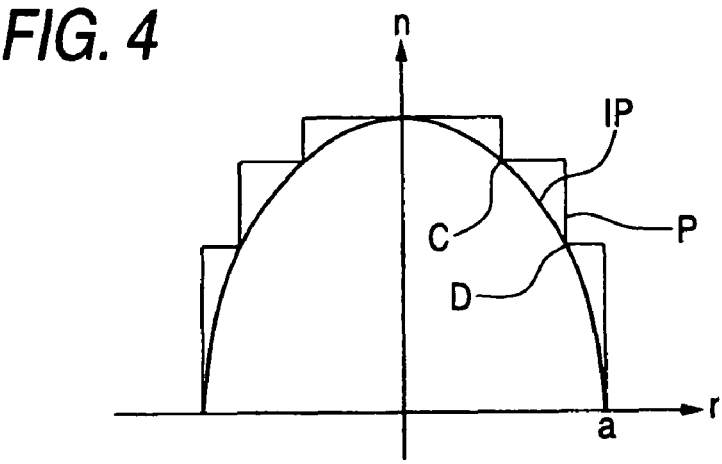
FIG. 4 is a schematic view showing one example of a refractive index profile of a core part together with an ideal refractive index profile.
Figure 5:
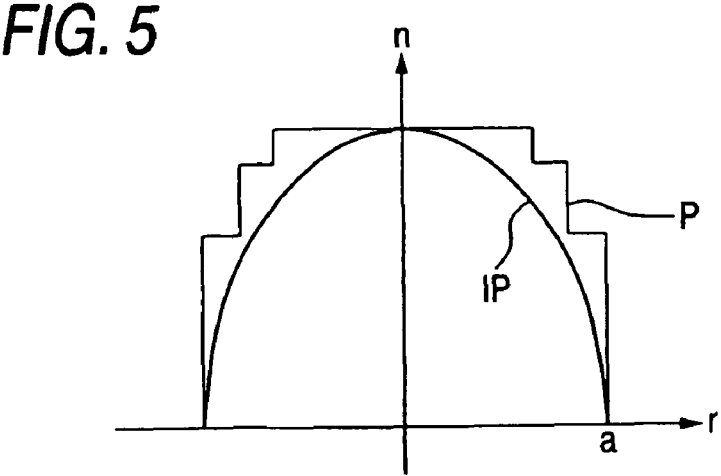
FIG. 5 is a schematic view showing one example of a refractive index profile of a core part together with an ideal refractive index profile.

FIGS. 3 to 5 show examples in which a central part and an end part in the radial direction in the refractive index profile of the core part are allowed to correspond to the ideal αth power type refractive index profile.

The refractive index profile P of a core part shown in FIG. 3 comes into contacts with the ideal refractive index profile IP in a first core layer at a center and intersects the ideal refractive index profile in a second core layer (a point A in the drawing) and in a third core layer (a point B in the drawing). Namely, the refractive index profile P is satisfactorily approximated to the ideal refractive index profile IP.

The refractive index profile P of a core part shown in FIG. 4 comes into contact with the ideal refractive index profile IP in a first core layer at a center, in a second core layer (a point C in the drawing) and in a third core layer (a point D in the drawing). Namely, the refractive index profile P is substantially approximated to the ideal refractive index profile IP.

The refractive index profile P of a core part shown in FIG. 5 naturally comes into contact with the ideal refractive index profile IP in a first core layer at a center, however, does not come into contact with, nor intersects the ideal refractive index profile in a second core layer and a third core layer. Namely, the refractive index profile P is separate from the ideal refractive index profile IP and hardly approximated thereto.

The example shown in FIG. 3 of the examples shown in FIGS. 3 to 5 has the largest bandwidth, and the example shown in FIG. 4 has a secondly largest bandwidth. In the case of the refractive index profile approximated so as to come into contact with or intersect the ideal refractive index profile IP like the examples shown in FIGS. 3 and 4, when the number of the layers is increased, a larger bandwidth can be obtained.

Further, to obtain good transmitting characteristics for measuring a temperature, the relative refractive index difference $\Delta n1$ of the first core layer 2a relative to the cladding part 3 is preferably set to 0.5% to 1.0%. Herein, the relative refractive index difference of the core layer relative to the cladding part is a ratio of the refractive index difference between the refractive indexes of the core layer and the cladding part with respect to the refractive index of the cladding part. In other words, the relative refractive index difference of the core layer relative to the cladding part is calculated by dividing the refractive index difference between the refractive indexes of the core layer and the cladding part by the refractive index of the cladding part.

As a method for producing an optical fiber preform from which the optical fiber is drawn, a method is exemplified as one example in which while a glass rod serving as the first core layer 2a is inserted into a glass pipe serving as the second core layer 2b, the glass rod and the glass pipe are heated to be formed integrally (what is called a rod-in-collapse), then, the integral body is inserted into a glass pipe serving as the third core layer 2c, and they are heated to be formed integrally, and further, the integral body is inserted into a glass pipe serving as the cladding part 3, and they are heated to be formed integrally.

When the optical fiber preform is produced by the rod-in-collapse method as described above, the glass rod and the glass pipes are produced so that the quantities of addition of fluorine are respectively set to prescribed values and the refractive indexes thereof are respectively set to desired refractive indexes. Thus, the preform for the multimode optical fiber 1 can be extremely easily produced. In the rod-in-collapse method, since the glass of the layers may be separately formed by an OVD method or a VAD method, a quantity of addition of fluorine to each layer can be easily adjusted. Further, the glass of the layers are respectively integrally formed by the rod-in-collapse method, so that the bandwidth of 200 MHz·km or higher can be easily obtained.

Then, the optical fiber preform produced in such a way is drawn by a drawing machine and thus the optical fiber 1 including the refractive index that is adjusted stepwise is obtained.

As other methods for producing the optical fiber preform from which the optical fiber 1 is obtained, exemplified are an MCVD method in which while gas (for instance, silicon tetrachloride) including a glass material is allowed to flow in a glass pipe serving as a cladding part 3, a quantity of addition of fluorine is adjusted stepwise to form a third core layer $2c$, a second core layer $2b$ and a first core layer $2a$ in order, a PCVD method in which a plasma is generated in a glass pipe to respectively form glass of layers and an OVD method in which a quantity of addition of fluorine is adjusted to deposit glass particles on the outer periphery of a rod corresponding to a first core layer $2a$ and thus a second core layer $2b$, a third core layer $2c$ and a cladding part 3 in order are formed. Further, the optical fiber preform can be produced by suitably combining the rod-in-collapse method, the MCVD method, the PCVD method and the OVD method.

In the optical fiber 1 shown in FIGS. 1 and 2, the number M of the layers of the core part 2 is 3, however, the number M of the layers of the core part 2 is desirably located within a range expressed by $3 \leq M \leq 20$.

Figure 6:
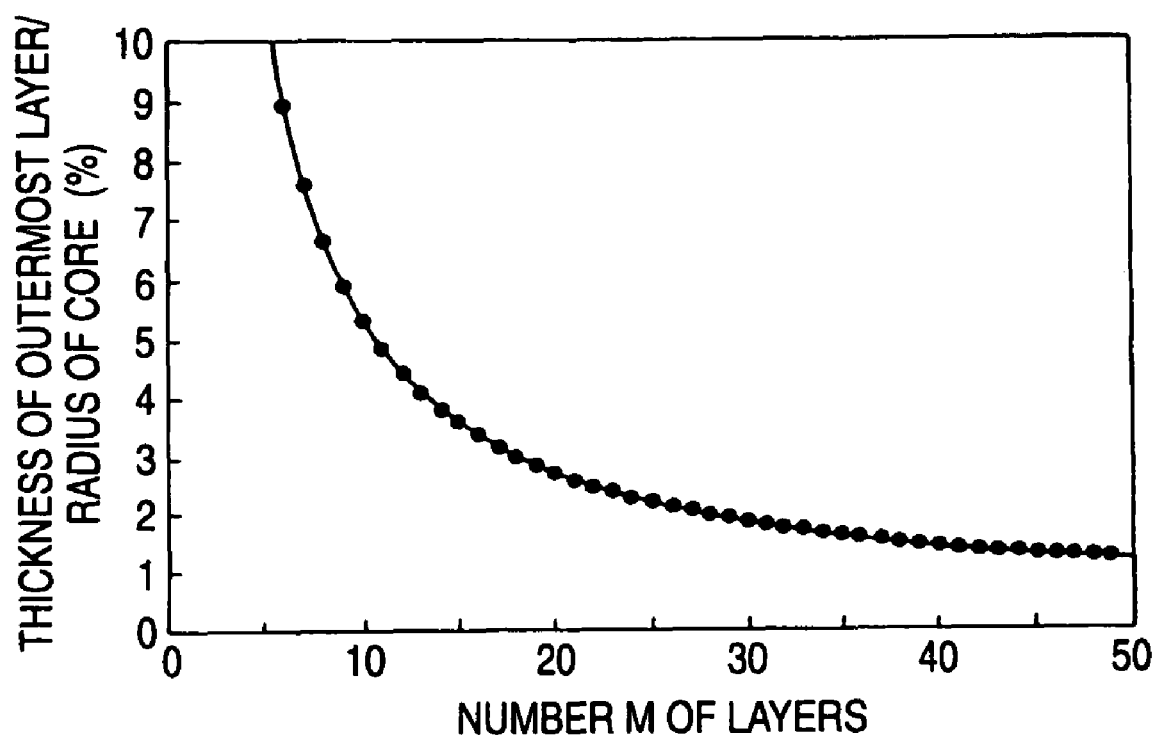
FIG. 6 is a graph showing the relation between the number of layers of the core part and the thickness of the layer.

When the core part 2 has two or smaller layers, the bandwidth is hardly increased. When the core part 2 has the number of layers exceeding 20, the number of producing processes is increased for the number of the layers, a production cost is enormously increased. Further, as shown in FIG. 6, when the number M of the layers of the core part is increased, the thickness of the layer is reduced. Accordingly, when the optical fiber preform is produced by the rod-in-collapse method, the optical fiber is liable to be non-circular. In a graph shown in FIG. 6, the thickness of the outermost layer obtained when the relative refractive index difference of the center of the core is equally divided by the number M of the layers is represented by a rate (%) relative to the radius of the entire part of the core part. Herein, the relative refractive index difference of the center of the core is a ratio of the refractive index difference between the refractive indexes of the center of core and the cladding part with respect to the refractive index of the cladding part. In other words, the relative refractive index difference of the refractive index of the center of the core is calculated by dividing the refractive index difference between the refractive indexes of the center of the core and the cladding part by the refractive index of the cladding part. The number M of the layers of the core part 2 is located within a range expressed by $3 \leq M \leq 20$, so that the optical fiber has sufficient transmitting characteristics as the optical fiber for measuring a temperature and is easily produced.

When the refractive index of the first core layer $2a$ does not need to be lowered, the first core layer may be directly made of the pure silica glass without adding fluorine thereto. Further, the refractive index may be slightly higher than that of the pure silica glass due to chlorine (Cl) mixed when the glass is produced otherwise, to increase the refractive index difference relative to the cladding, only a suitable quantity of chlorine is positively effectively added to the core part. Even when chlorine having a prescribed concentration or lower is included in the glass, hydrogen resistant characteristics are not affected thereby.

When the optical fiber is exposed to a hydrogen atmosphere, attenuation is increased. The increase of the attenuation due to hydrogen results from two causes. One of them is (A) the increase of the attenuation caused by hydrogen gas that permeates into the optical fiber and thereby absorbs transmitted lights. Another one of them is (B) the increase of the attenuation caused by the absorption of the transmitted lights due to a new bond formed by a chemical reaction of the hydrogen permeating into the optical fiber with a composition of the glass of the optical fiber. In (A), when the optical fiber is taken out from the hydrogen atmosphere, the hydrogen gas is vented outside the optical fiber, so that the increase of the transmission can be cancelled. However, in (B), since the bond is stable, the increase of the attenuation cannot be cancelled.

In the optical fiber using quartz type glass as a base material, since the permeating speed and solubility of the hydrogen gas in the glass hardly have differences depending on additives added to the glass of the optical fiber, the above-described (A) has no difference depending on the kinds of the additives. However, the above-described (B) shows a large difference depending on the kinds of the additives. As the additives to the optical fiber, germanium or phosphor is ordinarily frequently used. When the optical fiber to which these additives are added is exposed to the hydrogen atmosphere under en environment of high temperature, the attenuation is greatly increased.

In the optical fiber 1 of this embodiment, since fluorine is used as an additive to obtain the refractive index profile shown in FIG. 2, the increase of the attenuation of the above-described (B) hardly arises. Accordingly, even when the optical fiber is exposed to the hydrogen atmosphere under the environment of high temperature such as 120° C. or higher, good transmitting characteristics can be obtained and an S/N and a numerical aperture NA the same as those of an ordinary multimode optical fiber of the GI type can be obtained.

According to the above-described optical fiber 1, since the core part 2 has the structure including a plurality of layers in which the refractive index is decreased stepwise from the first core layer 2 as the innermost layer to the third core layer $2c$ as the outermost layer, the optical fiber can be easily produced only by adjusting a quantity of addition of fluorine for each of the layers. Further, the attenuation does not increase due to the influence of hydrogen, the optical fiber can be used without deteriorating the transmitting characteristics even under an environment where hydrogen exists.

In a Fiber-Optic Distributed Temperature Sensing System (DTS) used when submarine resources are searched, the Raman scattered lights of lights incident on the optical fiber are detected and thus temperature is measured in terms of the intensity ratio for Stokes' lights and anti-Stokes' lights of thereof. In this system, the optical fiber itself is used as a temperature sensor so that a continuous temperature distribution can be measured in a real time along the optical fiber over a long distance of several km.

When the attenuation of the optical fiber is increased owing to hydrogen with the elapse of time and depending on a wavelength, the intensity ratio for the Raman scattered lights is also changed with the elapse of time so that a temperature measuring accuracy is deteriorated and the absolute value of the measured temperature is also changed. Therefore, the hydrogen resistance is especially required for the optical fiber used for the DTS. Since the optical fiber 1 of this embodiment has no increase of the attenuation by hydrogen throughout the used wavelength area of the DTS, and accordingly, the optical fiber is extremely preferable as an optical fiber used for the DTS.

EXAMPLES

Now, referring to FIGS. 7 to 21, structural examples of the optical fiber are shown. FIGS. 7 to 21 are graphs respectively showing the refractive index profiles. In the graphs, the refractive index profile of the core part is formed in such a way that the central part and the end part in the radial direction of the core part are allowed to correspond to the ideal αth power ($\alpha=2.00$) type refractive index profile. An axis of ordinate of the graph designates the relative refractive index difference Δ (%) relative to the relative refractive index difference of the center of core. An axis of abscissa of the graph designates a radius r (μm) from the center of the core. In examples respectively, a diameter of the cladding part is 125 μm.

Example 1

Figure 7:
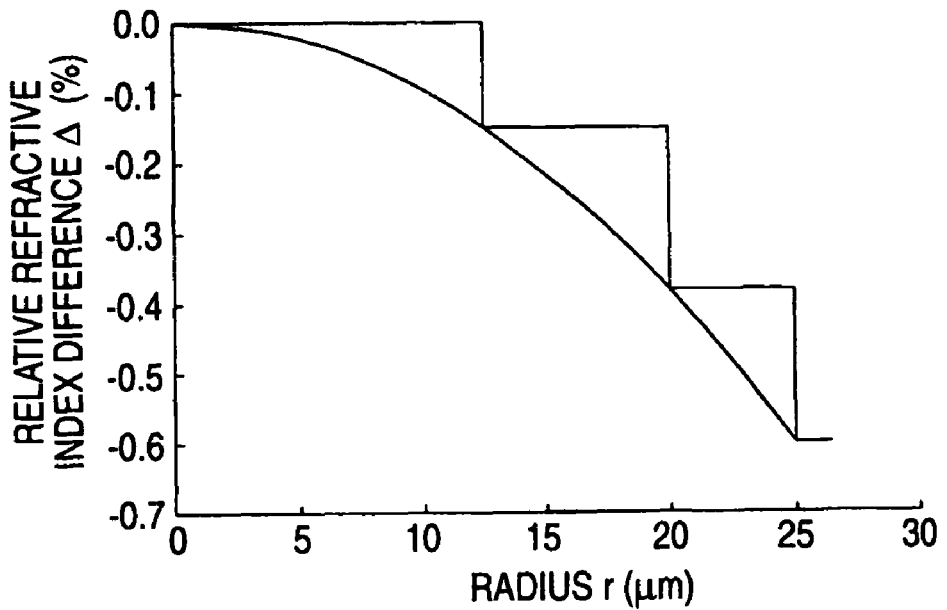
FIG. 7 is a schematic view showing one example of a refractive index profile of a core part together with an ideal refractive index profile.

The refractive index profile of the core part of an optical fiber of an example 1 shows that of a three-step type (the number M of layers of the core part=3) as shown in FIG. 7 and a diameter of the core part is 50 μm. A first core layer has a relative refractive index difference $\Delta n1=0.60\%$ relative to a cladding part and a diameter d1=25 μm. A second core layer has a relative refractive index difference $\Delta n2=0.45\%$ relative to the cladding part and a diameter d2=40 μm. A third core layer has a relative refractive index difference $\Delta n3=0.22\%$ relative to the cladding part and a diameter d3=50 μm. Herein, the relative refractive index difference relative to the cladding part is a ratio of the refractive index difference between the refractive indexes of each of the core layers and the cladding part with respect to the refractive index of the cladding part. In other words, the relative refractive index difference relative to the cladding part is calculated by dividing the refractive index difference between the refractive indexes of each of the core layer and the cladding part by the refractive index of the cladding part. In this example, the core part of the optical fiber has parts that come into contact with the ideal refractive index profile in the second core layer and the third core layer.

The bandwidth of this optical fiber is 260 MHz·km at the wavelength of 1550 nm.

Namely, the optical fiber of this example 1 is the same as the optical fiber 1 of the above-described embodiment explained by referring to FIGS. 1 and 2.

Example 2

Figure 8:
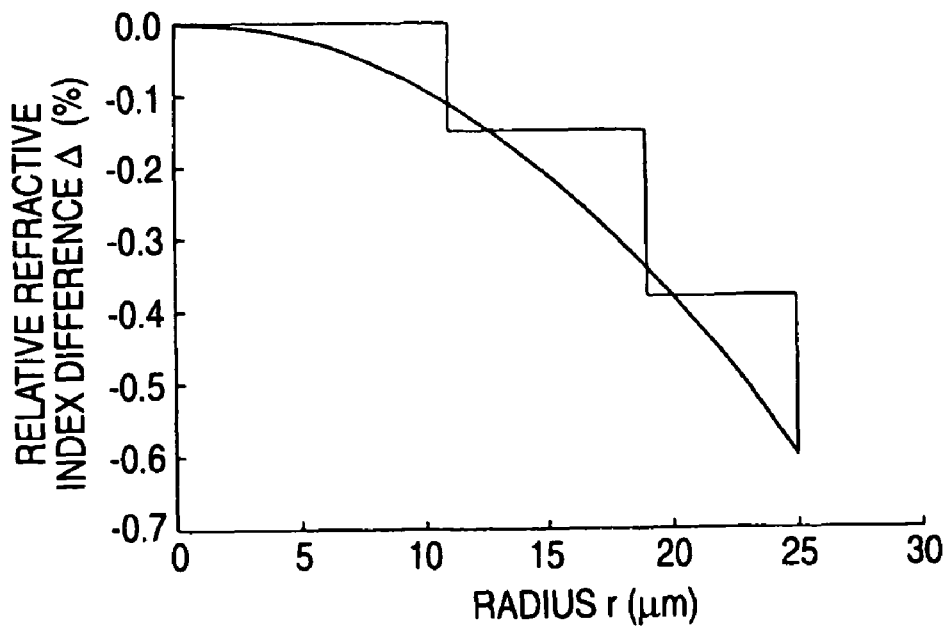
FIG. 8 is a schematic view showing one example of a refractive index profile of a core part together with an ideal refractive index profile.

The refractive index profile of the core part of an optical fiber of an example 2 shows that of a three-step type (the number M of layers of the core part=3) as shown in FIG. 8 and a diameter of the core part is 50 μm. A first core layer has a relative refractive index difference $\Delta n1=0.60\%$ relative to a cladding part and a diameter d1=22 μm. A second core layer has a relative refractive index difference $\Delta n2=0.45\%$ relative to the cladding part and a diameter d2=38 μm. A third core layer has a relative refractive index difference $\Delta n3=0.22\%$ relative to the cladding part and a diameter d3=50 μm. In this example, the core part of the optical fiber has parts that intersect the ideal refractive index profile in the second core layer and the third core layer.

The bandwidth of this optical fiber is 250 MHz·km at the wavelength of 1550 nm.

Example 3

Figure 9:
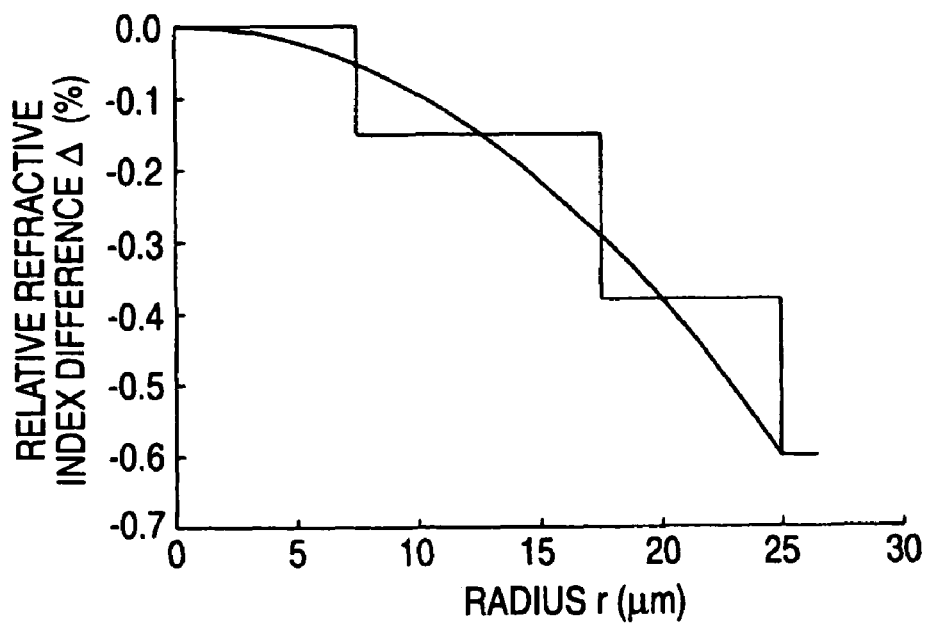
FIG. 9 is a schematic view showing one example of a refractive index profile of a core part together with an ideal refractive index profile.

The refractive index profile of the core part of an optical fiber of an example 3 shows that of a three-step type (the number M of layers of the core part=3) as shown in FIG. 9 and a diameter of the core part is 50 μm. A first core layer has a relative refractive index difference $\Delta n1=0.60\%$ relative to a cladding part and a diameter d1=15 μm. A second core layer has a relative refractive index difference $\Delta n2=0.45\%$ relative to the cladding part and a diameter d2=35 μm. A third core layer has a relative refractive index difference $\Delta n3$ 0.22% relative to the cladding part and a diameter d3=50 μm. In this example, the core part of the optical fiber has parts that intersect the ideal refractive index profile in the second core layer and the third core layer.

The bandwidth of this optical fiber is 200 MHz·km at the wavelength of 1550 nm.

Example 4

Figure 10:
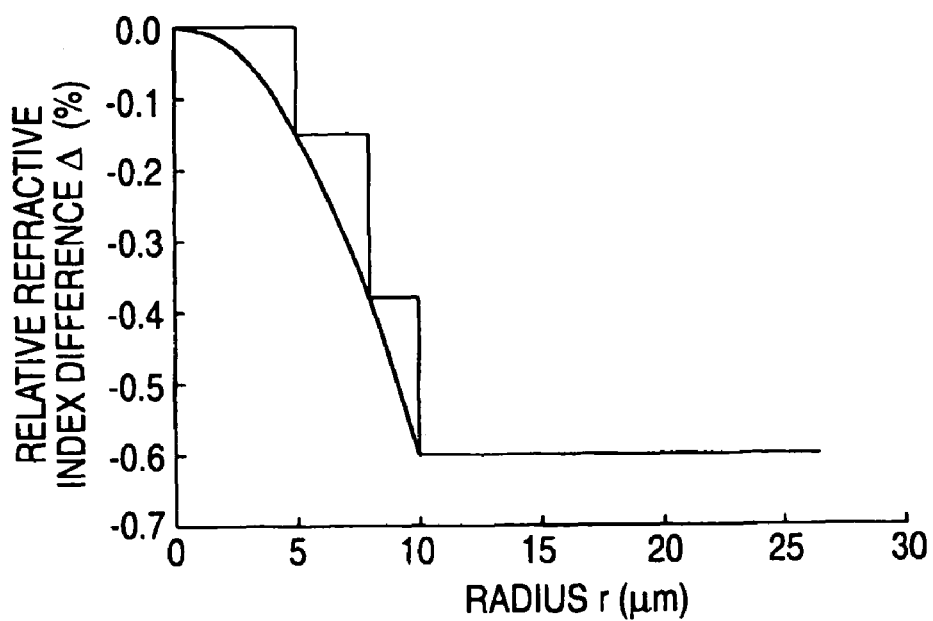
FIG. 10 is a schematic view showing one example of a refractive index profile of a core part together with an ideal refractive index profile.

The refractive index profile of the core part of an optical fiber of an example 4 shows that of a three-step type (the number M of layers of the core part=3) as shown in FIG. 10 and a diameter of the core part is 20 μm. A first core layer has a relative refractive index difference $\Delta n1=0.60\%$ relative to a cladding part and a diameter d1=1 μm. A second core layer has a relative refractive index difference $\Delta n2=0.45\%$ relative to the cladding part and a diameter d2=16 μm. A third core layer has a relative refractive index difference $\Delta n3=0.22\%$ relative to the cladding part and a diameter d3=20 μm. In this example, the core part of the optical fiber has parts that come into contact with the ideal refractive index profile in the second core layer and the third core layer.

The bandwidth of this optical fiber is 300 MHz·km at the wavelength of 1550 nm.

Example 5

Figure 11:
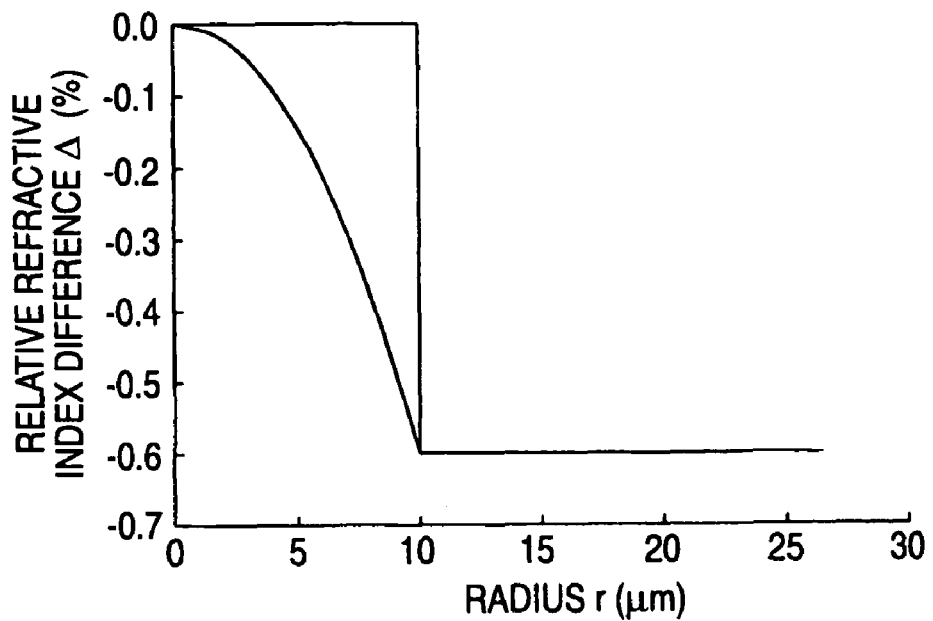
FIG. 11 is a schematic view showing one example of a refractive index profile of a core part together with an ideal refractive index profile.

The refractive index profile of the core part of an optical fiber of an example 5 shows that of a one-step type (the number M of layers of the core part=1) as shown in FIG. 11 and a diameter of the core part is 20 μm. A first core layer has a relative refractive index difference $\Delta n1\sim0.60\%$ relative to a refractive index of a cladding part and a diameter d1=20 μm.

In this example, the core part of the optical fiber has no parts that come into contact with or intersect the ideal refractive index profile except the central part and the end part in the radial direction of the core part.

The bandwidth of this optical fiber is 50 MHz·km at the wavelength of 1550 nm.

Example 6

Figure 12:
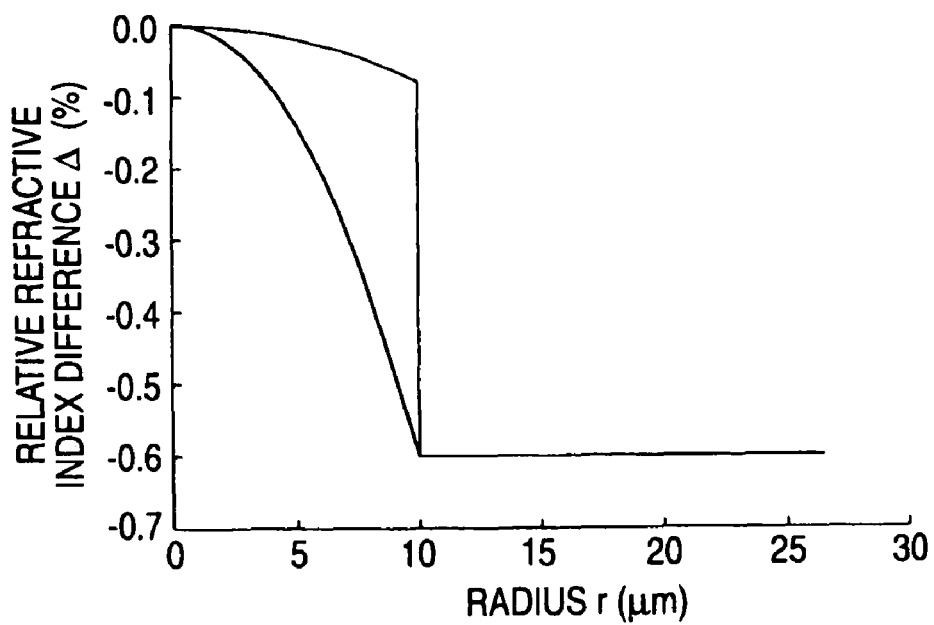
FIG. 12 is a schematic view showing one example of a refractive index profile of a core part together with an ideal refractive index profile.

The refractive index profile of the core part of an optical fiber of an example 6 shows that of a circular one-step type (the number M of layers of the core part=1) as shown in FIG. 12 and a diameter of the core part is 20 μm. The circular step type is one of the refractive index profiles of the step type. In the circular step type, the refractive index changes so as to be gradually decreased toward an outer side in the radial direction. A first core layer has a relative refractive index difference $\Delta n1=0.60\%$ of the center of the core relative to a cladding part and a diameter d1=20 μm. Herein, the relative refractive index difference of the center of the core relative to the cladding part is a ratio of the refractive index difference between the refractive indexes of the center of core and the cladding part with respect to the refractive index of the cladding part. In other words, the relative refractive index difference of the center of the core relative to the cladding part is calculated by dividing the refractive index difference between the refractive indexes of the center of the core and the cladding part by the refractive index of the cladding part. In this example, the core part of the optical fiber has no parts that come into contact with or intersect the ideal refractive index profile except the central part and the end part in the radial direction of the core part.

The bandwidth of this optical fiber is 55 MHz·km at the wavelength of 1550 nm.

Example 7

Figure 13:
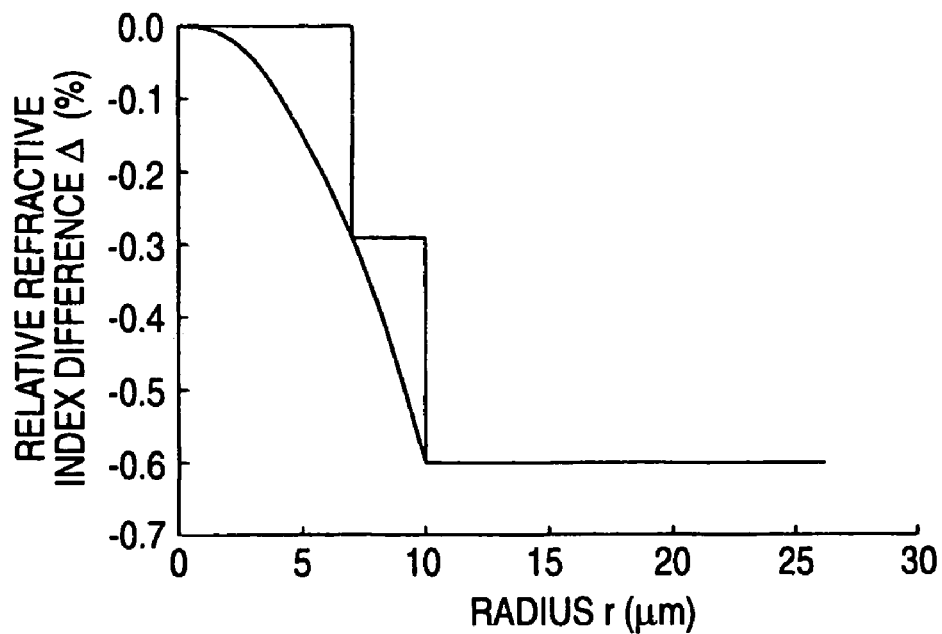
FIG. 13 is a schematic view showing one example of a refractive index profile of a core part together with an ideal refractive index profile.

The refractive index profile of the core part of an optical fiber of an example 7 shows that of a two-step type (the number M of layers of the core part=2) as shown in FIG. 13 and a diameter of the core part is 20 μm. A first core layer has a relative refractive index difference Δn1=0.60% relative to a cladding part and a diameter d1=14 μm. A second core layer has a relative refractive index difference Δn2=0.31% relative to the cladding part and a diameter d2=20 μm. In this example, the core part of the optical fiber has a part that comes into contact with the ideal refractive index profile in the second core layer.

The bandwidth of this optical fiber is 120 MHz·km at the wavelength of 1550 nm.

Example 8

Figure 14:
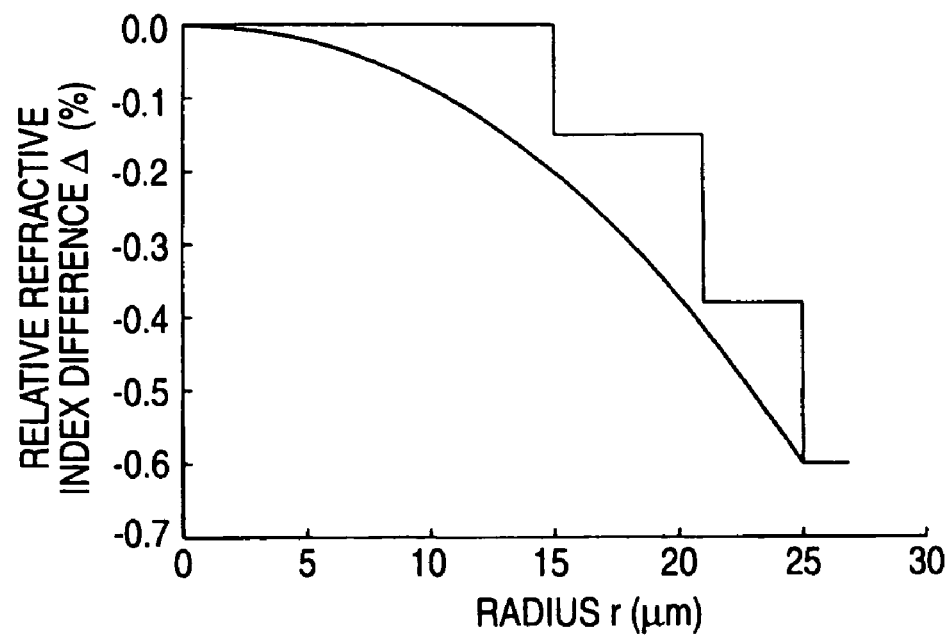
FIG. 14 is a schematic view showing one example of a refractive index profile of a core part together with an ideal refractive index profile.

The refractive index profile of the core part of an optical fiber of an example 8 shows that of a three-step type (the number M of layers of the core part=3) as shown in FIG. 14 and a diameter of the core part is 50 μm. A first core layer has a relative refractive index difference Δn1=0.60% relative to a cladding part and a diameter d1=30 μm. A second core layer has a relative refractive index difference Δn2=0.45% relative to the cladding part and a diameter d2 42 μm. A third core layer has a relative refractive index difference Δn3=0.22% relative to the cladding part and a diameter d3=50 μm. In this example, the core part of the optical fiber has no parts that come into contact with or intersect the ideal refractive index profile except the central part and the end part in the radial direction of the core part.

The bandwidth of this optical fiber is 150 MHz·km at the wavelength of 1550 nm.

Example 9

Figure 15:
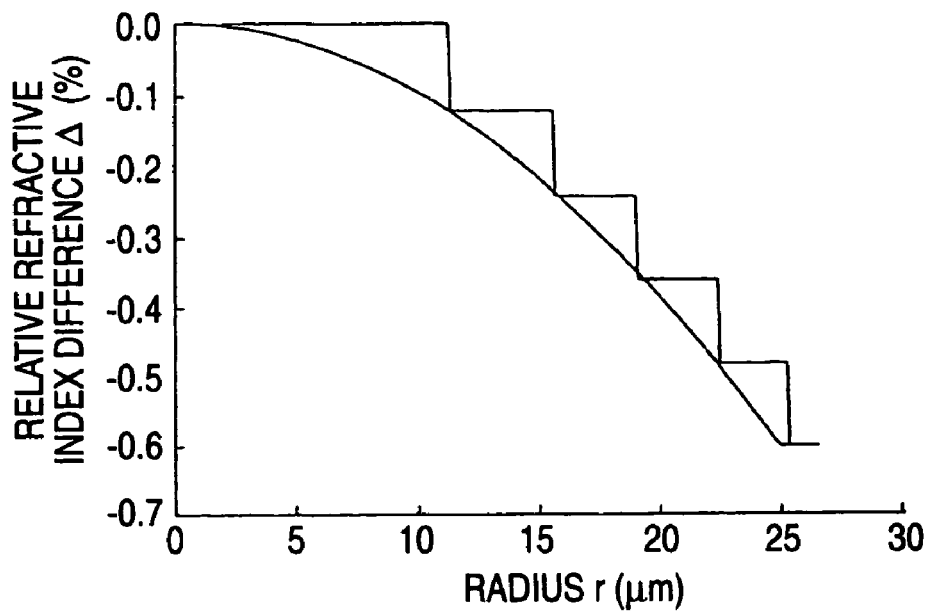
FIG. 15 is a schematic view showing one example of a refractive index profile of a core part together with an ideal refractive index profile.

The refractive index profile of the core part of an optical fiber of an example 9 shows that of a five-step type (the number M of layers of the core part=5) as shown in FIG. 15 and a diameter of the core part is 50 μm. A first core layer has a relative refractive index difference Δn1=0.60% relative to a cladding part and a diameter d1=24 μm. A second core layer has a relative refractive index difference Δn2=0.48% relative to the cladding part and a diameter d2=33 μm. A third core layer has a relative refractive index difference Δn3=0.36% relative to the cladding part and a diameter d3=41 μm. A fourth core layer has a relative refractive index difference Δn4=0.24% relative to the cladding part and a diameter d4=47 μm. A fifth core layer has a relative refractive index difference Δn5=0.12% relative to the cladding part and a diameter d5=50 μm. In this example, the core part of the optical fiber has parts that come into contact with the ideal refractive index profile in the second core layer, the third core layer, the fourth core layer and the fifth core layer.

The bandwidth of this optical fiber is 320 MHz·km at the wavelength of 1550 nm.

Example 10

Figure 16:
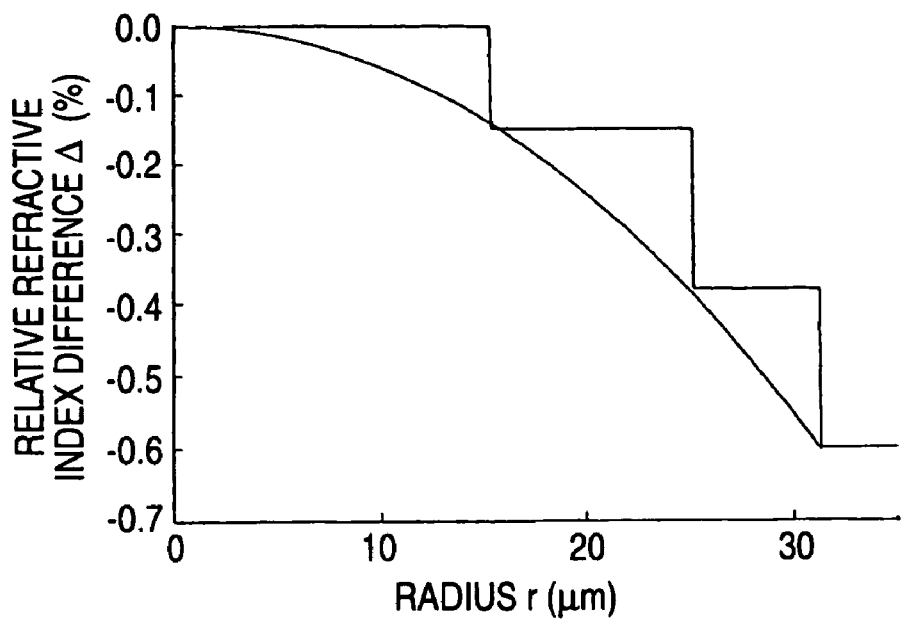
FIG. 16 is a schematic view showing one example of a refractive index profile of a core part together with an ideal refractive index profile.

The refractive index profile of the core part of an optical fiber of an example 10 shows that of a three-step type (the number M of layers of the core part=3) as shown in FIG. 16 and a diameter of the core part is 62.5 μm. A first core layer has a relative refractive index difference Δn=0.60% relative to a cladding part and a diameter d1=30.2 μm. A second core layer has a relative refractive index difference Δn2=0.45% relative to the cladding part and a diameter d2=50 μm. A third core layer has a relative refractive index difference Δn3=0.22% relative to the cladding part and a diameter d3=62.5 μm. In this example, the core part of the optical fiber has parts that come into contact with the ideal refractive index profile in the second core layer and the third core layer.

The bandwidth of this optical fiber is 200 MHz·km at the wavelength of 1550 nm.

Example 11

Figure 17:
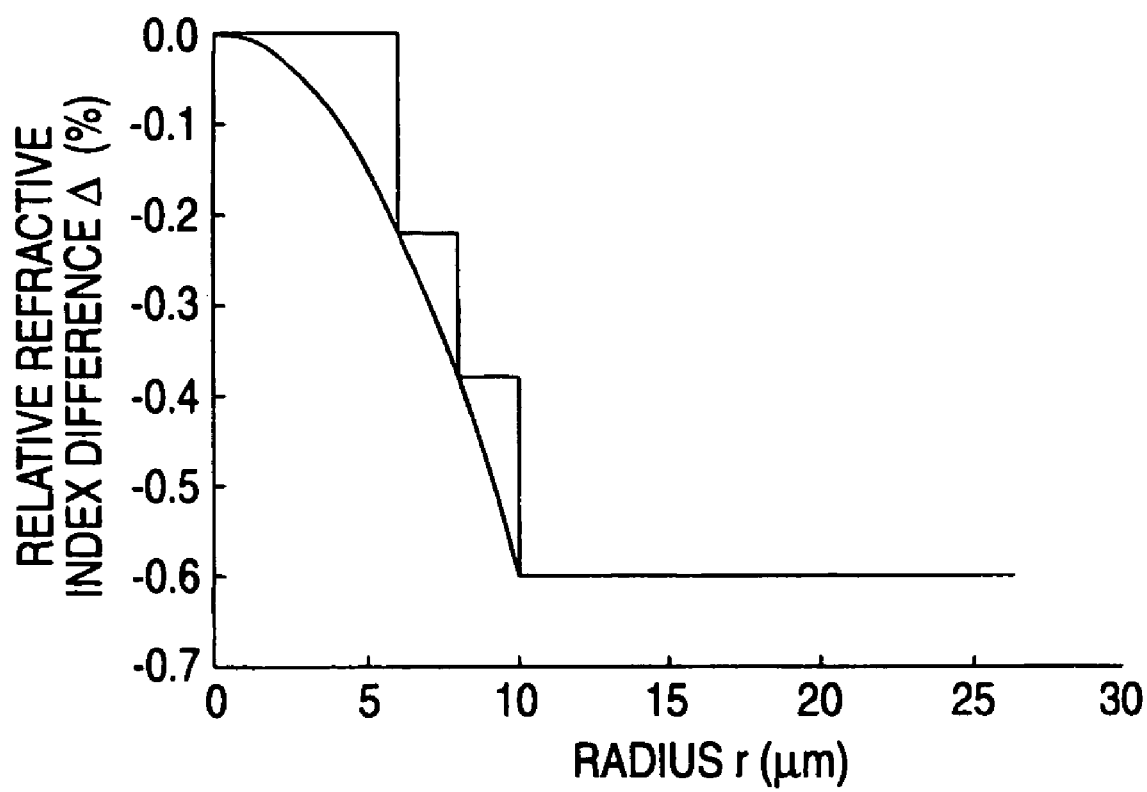
FIG. 17 is a schematic view showing one example of a refractive index profile of a core part together with an ideal refractive index profile.

The refractive index profile of the core part of an optical fiber of an example 11 shows that of a three-step type (the number M of layers of the core part=3) as shown in FIG. 17 and a diameter of the core part is 20 μm. A first core layer has a relative refractive index difference Δn1=0.60% relative to a cladding part and a diameter d1=12 μm. A second core layer has a relative refractive index difference Δn2=0.45% relative to the cladding part and a diameter d2=16 μm. A third core layer has a relative refractive index difference Δn3=0.22% relative to the cladding part and a diameter d3=20 μm. In this example, the core part of the optical fiber has parts that come into contact with the ideal refractive index profile in the second core layer and the third core layer.

The bandwidth of this optical fiber is 290 MHz·km at the wavelength of 1550 nm.

Example 12

Figure 18:
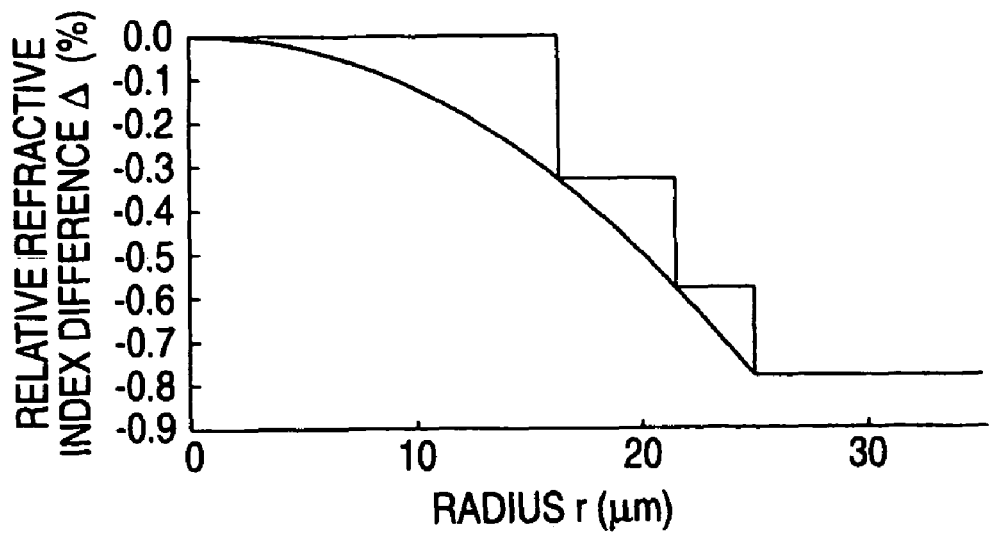
FIG. 18 is a schematic view showing one example of a refractive index profile of a core part together with an ideal refractive index profile.

The refractive index profile of the core part of an optical fiber of an example 12 shows that of a three-step type (the number M of layers of the core part=3) as shown in FIG. 18 and a diameter of the core part is 50 μm. A first core layer has a relative refractive index difference Δn1=0.78% relative to a cladding part and a diameter d1=32.6 μm. A second core layer has a relative refractive index difference Δn2=0.45% relative to the cladding part and a diameter d2=43.1 μm. A third core layer has a relative refractive index difference Δn3=0.20% relative to the cladding part and a diameter d3=50 μm. In this example, the core part of the optical fiber has parts that come into contact with the ideal refractive index profile in the second core layer and the third core layer.

The bandwidth of this optical fiber is 180 MHz·km at the wavelength of 1550 nm.

Example 13

Figure 19:
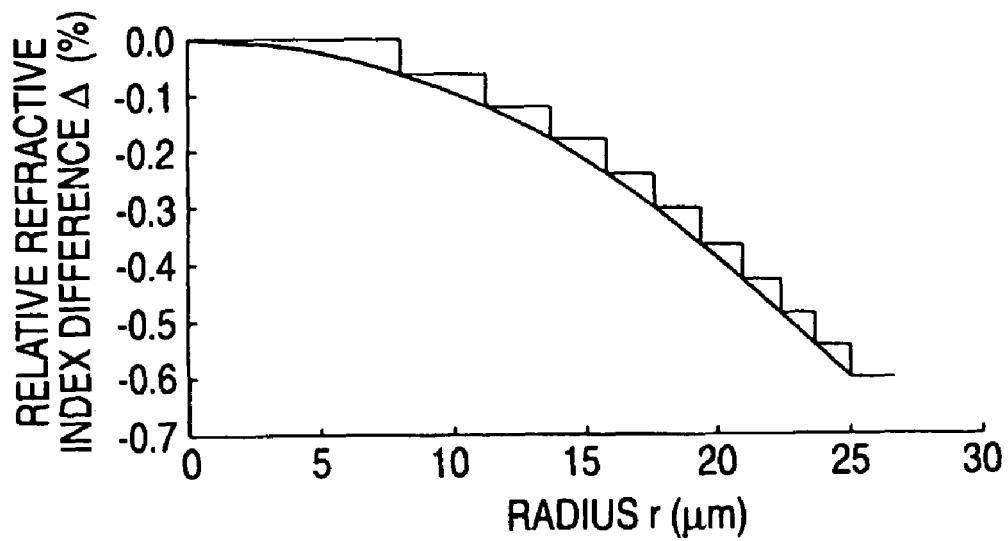
FIG. 19 is a schematic view showing one example of a refractive index profile of a core part together with an ideal refractive index profile.

The refractive index profile of the core part of an optical fiber of an example 13 shows that of a ten-step type (the number M of layers of the core part=10) as shown in FIG. 19 and a diameter of the core part is 50 μm. The preform of the optical fiber of this example is produced by the MCVD method. A first core layer has a relative refractive index difference Δn1=0.6% relative to a cladding part. In this example, the core part of the optical fiber has parts that respectively come into contact with the ideal refractive index profile in all the core layers.

The bandwidth of this optical fiber is 950 MHz·km at the wavelength of 1550 nm.

Example 14

Figure 20:
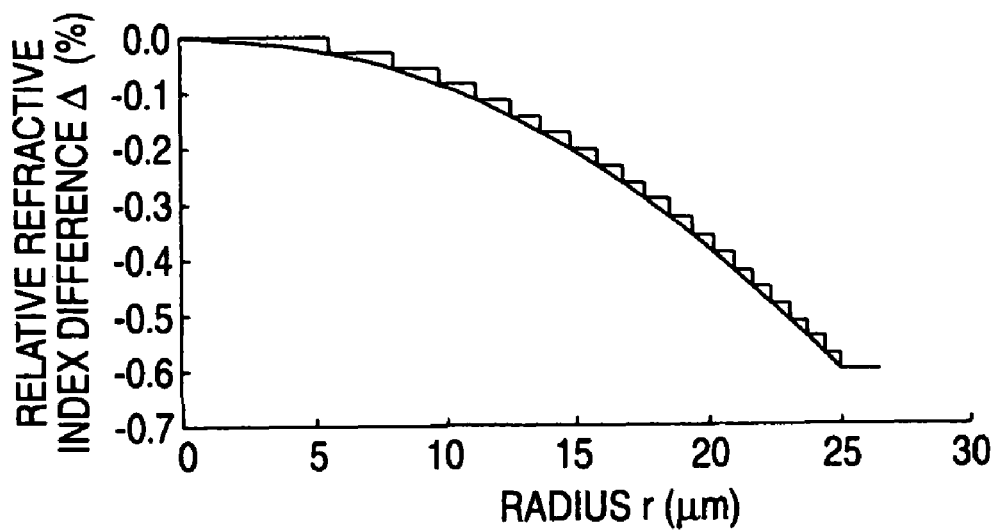
FIG. 20 is a schematic view showing one example of a refractive index profile of a core part together with an ideal refractive index profile.

The refractive index profile of the core part of an optical fiber of an example 14 shows that of a twenty-step type (the number M of layers of the core part=20) as shown in FIG. 20 and a diameter of the core part is 50 μm. The preform of the optical fiber of this example is produced by the MCVD method. A first core layer has a relative refractive index difference Δn1=0.6% relative to a cladding part. In this example, the core part of the optical fiber has parts that respectively come into contact with the ideal refractive index profile in all the core layers.

The bandwidth of this optical fiber is 1500 MHz·km at the wavelength of 1550 nm.

Example 15

Figure 21:
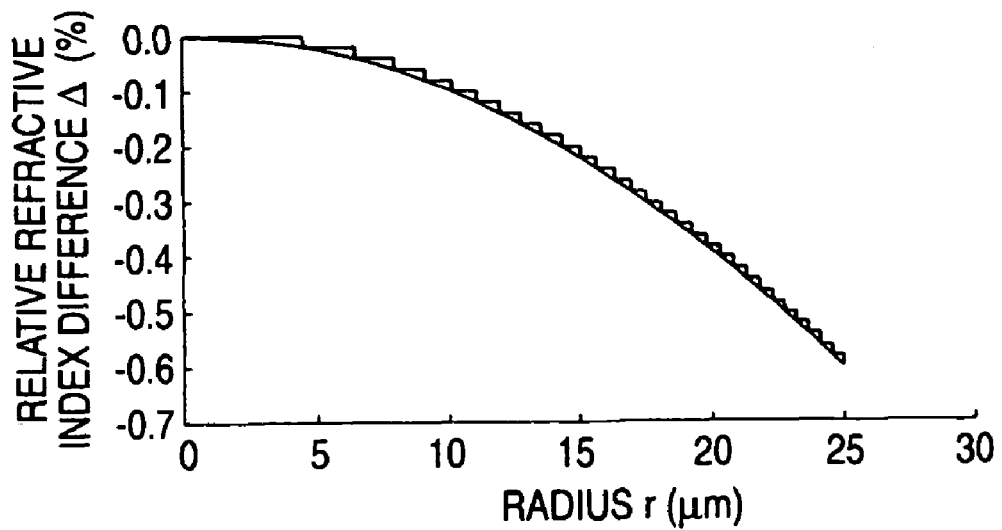
FIG. 21 is a schematic view showing one example of a refractive index profile of a core part together with an ideal refractive index profile.

The refractive index profile of the core part of an optical fiber of an example 15 shows that of a thirty-step type (the number M of layers of the core part=30) as shown in FIG. 21 and a diameter of the core part is 50 μm. The preform of the optical fiber of this example is produced by the MCVD method. A first core layer has a relative refractive index difference Δn1=0.6% relative to a cladding part. In this example, the core part of the optical fiber has parts that respectively come into contact with the ideal refractive index profile in all the core layers.

The bandwidth of this optical fiber is 2100 MHz·km at the wavelength of 1550 nm.

A test of hydrogen resistant characteristics was carried out for the example (the example 1) of the optical fiber according to the present invention and a comparative example of a usual multimode optical fiber.

The optical fiber of the example 1 according to the present invention is the optical fiber specifically shown in FIGS. 1 and 2. The optical fiber of the comparative example is a multimode and has GI type refractive index profile formed by adding germanium.

When entry of hydrogen gas from outside is prevented by, for instance, a cable so that the concentration of the hydrogen gas is low, the attenuation is hardly increased due to the absorption of the transmitted lights by the hydrogen gas that is mentioned in the above-described (A). The attenuation is mainly increased owing to the chemical bond of the hydrogen to the glass that is mentioned in the above-described (B).

Thus, the test of the hydrogen resistant characteristics, which test is concerning the increase of the attenuation due to the chemical bond of hydrogen to the glass, was carried out.

The optical fiber of the example 1 and the optical fiber of the comparative example were left for 300 hours in a hydrogen atmosphere of 2 atm (hydrogen of 100%) and an environment of temperature of 150° C. After that, the optical fibers were placed in air for several days and the hydrogen gas was degassed from the optical fibers, then, a quantity of the increase of the attenuation (namely, a quantity of the increase of the attenuation of the above-described (B)) was measured respectively in the optical fibers and the hydrogen resistant characteristics were examined. Results of the example 1 are shown in FIG. 22 and results of the comparative example are shown in FIG. 23.

Figure 22:
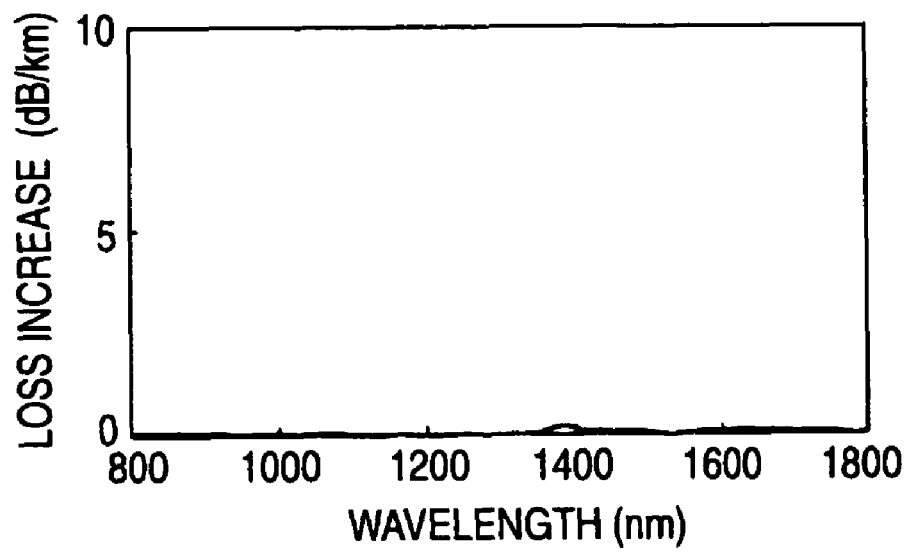
FIG. 22 is a graph diagram showing the change of attenuation due to hydrogen in the optical fiber according to the present invention.
Figure 23:
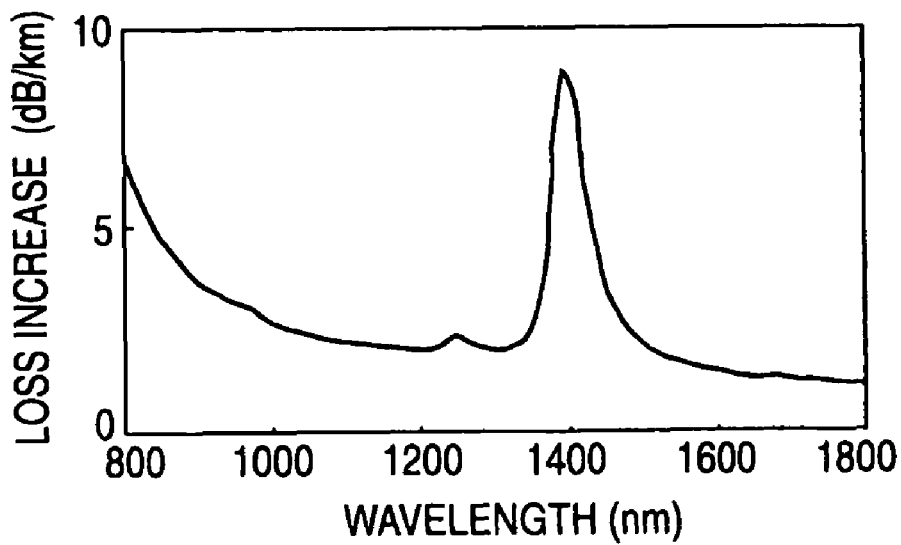
FIG. 23 is a graph diagram showing the change of attenuation due to hydrogen in a multimode optical fiber of a GI type.

As shown in FIG. 22, in the optical fiber of the example 1, the attenuation was not increased in all the measured wavelength and only a change as little as an error in measurement was recognized. As compared therewith, in the optical fiber of the comparative example shown in FIG. 23, the attenuation was increased in all the measured wavelength. Especially, the peak of the increase was recognized about 1400 nm. This phenomenon is considered to be the increase of the attenuation due to the chemical bond of hydrogen to glass.

Figure 24:
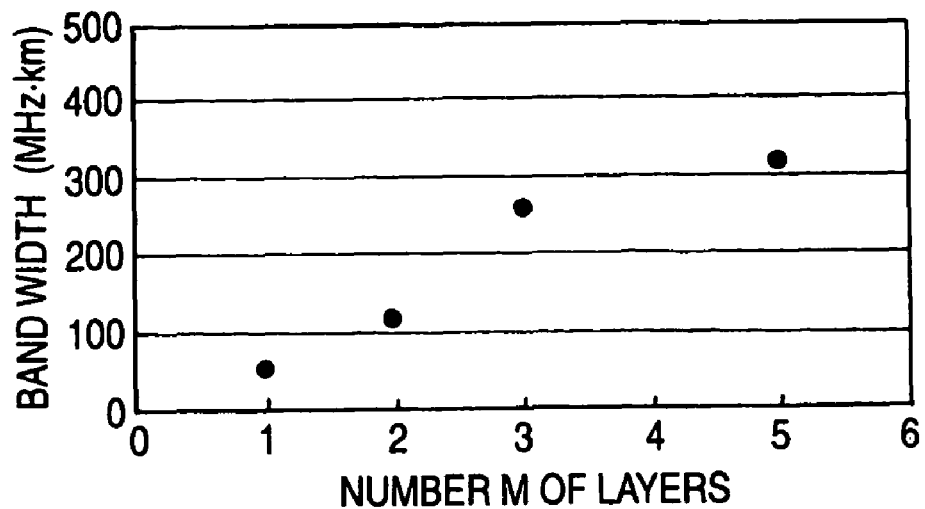
FIG. 24 is a graph showing the relation between the number of layers of the core part and a bandwidth.

Now, in FIG. 24, a graph is shown in which the number M of the layers of the core part is compared with the bandwidth respectively for the examples 1, 6, 7 and 9. In the example 7 (see FIG. 13) having the number M of layers=2, the example 1 (see FIG. 7) having the number M of layers=3, and the example 9 (see FIG. 15) having the number M of layers 5 except the example 6 (see FIG. 12) having the number of layers=1, the refractive index profiles thereof come into contact with the ideal refractive index profile respectively in the layers. A degree of approximation of the core part to the ideal refractive index profile is substantially equal.

As shown in FIG. 24, as the number M of the layers is increased, the bandwidth is found to be liable to increase. As can be understood, when the number M of the layers is 3 or more, the bandwidth of 200 MHz·km or higher required for measuring a temperature is easily obtained. Therefore, in the case of the optical fiber used for measuring a temperature, to obtain the bandwidth of 200 MHz·Km or higher and improve a productivity, the number M of the layers is preferably set to 3 to 5.

Figure 25:
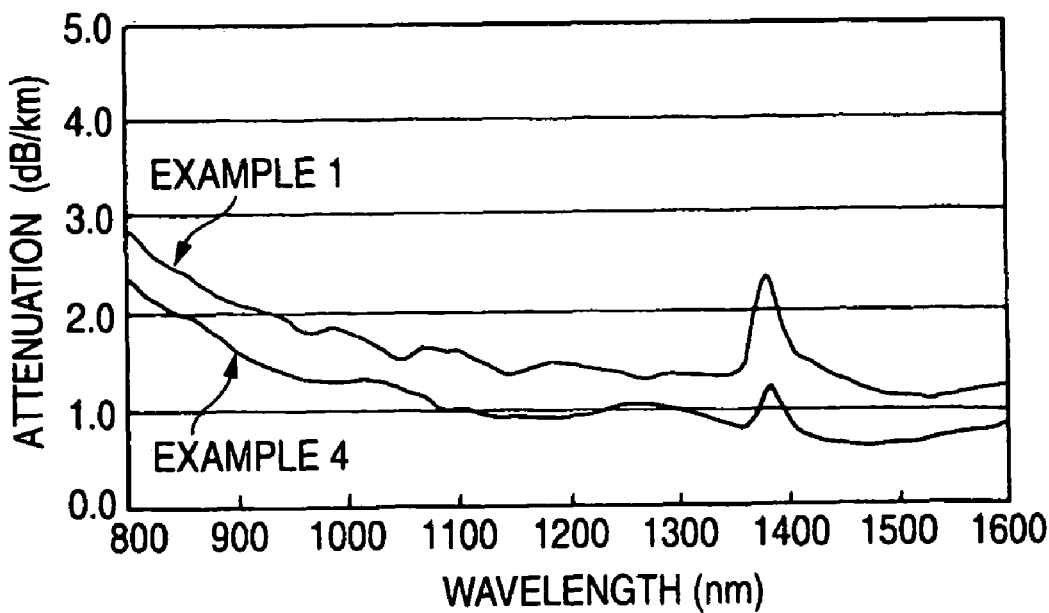
FIG. 25 is a graph showing the relation between wavelength and the attenuation for optical fibers having different core diameters.

Now, a graph in which the attenuationes of the examples 1 and 4 are compared with each other is shown in FIG. 25. In the examples 1 and 4, while the cladding part has the same diameter (125 μm), the diameter of the core part of the example 1 is 50 μm and the diameter of the core part of the example 4 is 20 μm. In the example 4 having a smaller diameter, the attenuation is reduced. This is considered to be arise, as a reason, because the core part having a smaller diameter is stronger to lateral pressure exerted from an external structure (a resin coating layer or the like) of the cladding part. Further, since the bandwidth of the example 4 is larger than that of the example 1, for instance, to improve the temperature measuring accuracy and the distance resolution of the DTS, the diameter of the core is advantageously reduced. However, when the diameter of the core of a pigtail is 50 μm in the side of the DTS on which measured light is incident, if the optical fiber having the diameter of the core of 20 μm is connected thereto, a connection attenuation is increased to generate an error in the measurement of a temperature. Accordingly, when the temperature is calculated from the intensity ratio for the detected Raman scattered lights, the calculated temperature may be corrected.

Figure 26:
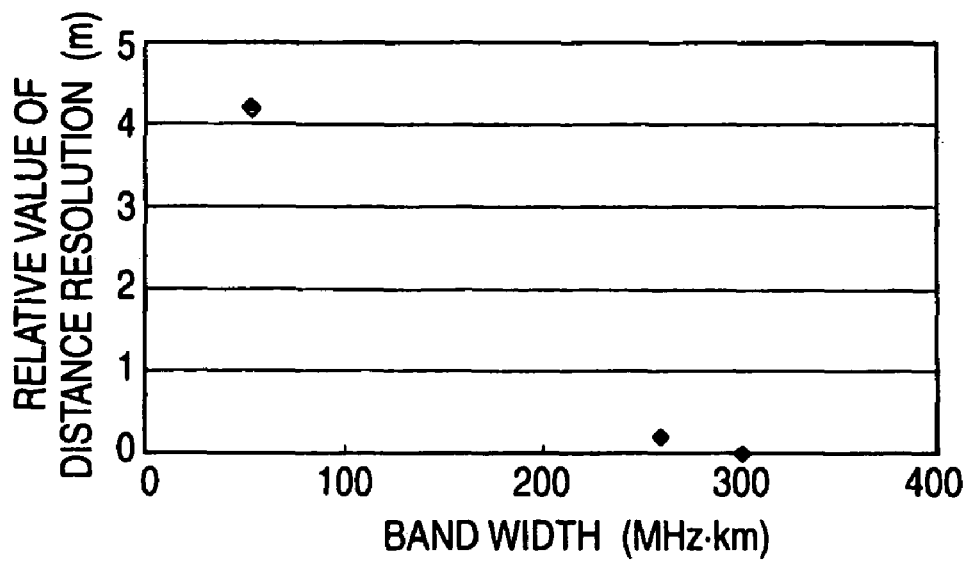
FIG. 26 is a graph showing the relation between the bandwidth and a distance resolution.

The optical fibers of the above-described examples 1, 4 and 6 were used to examine the relation between the distance resolution of the DTS and the bandwidth. The results thereof are shown in FIG. 26. The distance resolution of the DTS means a distance until a measured value precisely follows a position where temperature suddenly changes. An axis of ordinate of a graph shown in FIG. 26 designates the relative value of the distance resolution of the DTS and shows an increased value at a position separated by 5 km by considering as a reference the distance resolution at an end of the optical fiber on which the measure light is incident. In the example 6 having the bandwidth of 55 MHz·km, the relative value of the distance resolution exceeds 4. On the other hand, in the examples 1 and 4 having the bandwidths of 200 MHz·km or higher, the relative values of the distance resolution show values substantially near to zero. In such a way, the distance resolution changes depending on the bandwidth. As the bandwidth is larger, the distance resolution is reduced. Then, as apparently recognized, the bandwidth is preferably set to 2.00 MHz·km or higher to make the distance resolution good.

Figure 27:
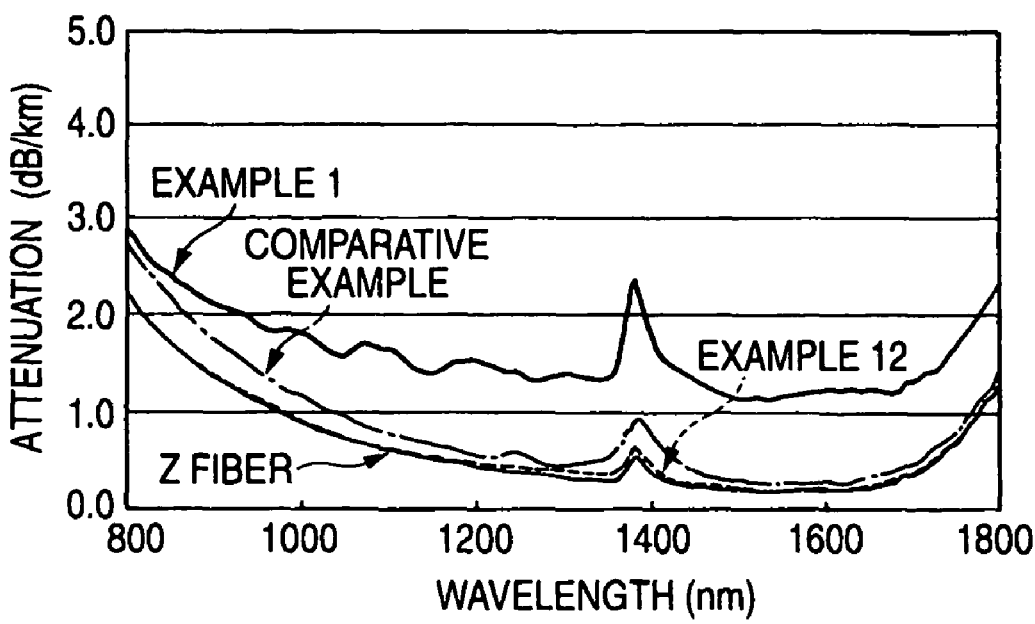
FIG. 27 is a graph showing the relation between the wavelength and the attenuation for different kinds of optical fibers.

Now, in FIG. 27, a graph is shown in which the dependence of the attenuation on wavelength is compared in the above-described example 1, the example 12, a comparative example and a reference example of a single-mode fiber having a pure silica glass core. The example 1 has an NA of 0.15 and is affected by lateral pressure to have the attenuation larger than that of the comparative example (an ordinary multimode optical fiber of the GI type). The example 12 with the NA of 0.18 has the attenuation smaller than that of the comparative example. The temperature measuring accuracy of the DTS depends on the attenuation due to the characteristics of the optical fiber itself as well as on the attenuation increasing owing to hydrogen with the elapse of time. When the attenuation is large, the temperature measuring accuracy is deteriorated. Since the optical fiber of the example 12 has the attenuation smaller than that of the optical fiber of the comparative example that is ordinarily used as a temperature sensor over the using wavelength of the DTS, the temperature measuring accuracy is improved. The optical fiber of the reference example is referred to as the above-described pure silica core fiber (Z fiber) and has the small attenuation. However, since the pure silica core fiber has a single mode, the diameter of the core is small and the NA is small. Thus, the temperature measuring accuracy is inferior. As compared therewith, since the optical fiber of the example 12 has a sufficiently large core diameter and the small attenuation, the optical fiber of the example 12 is suitably employed for the DTS.

Figure 28:
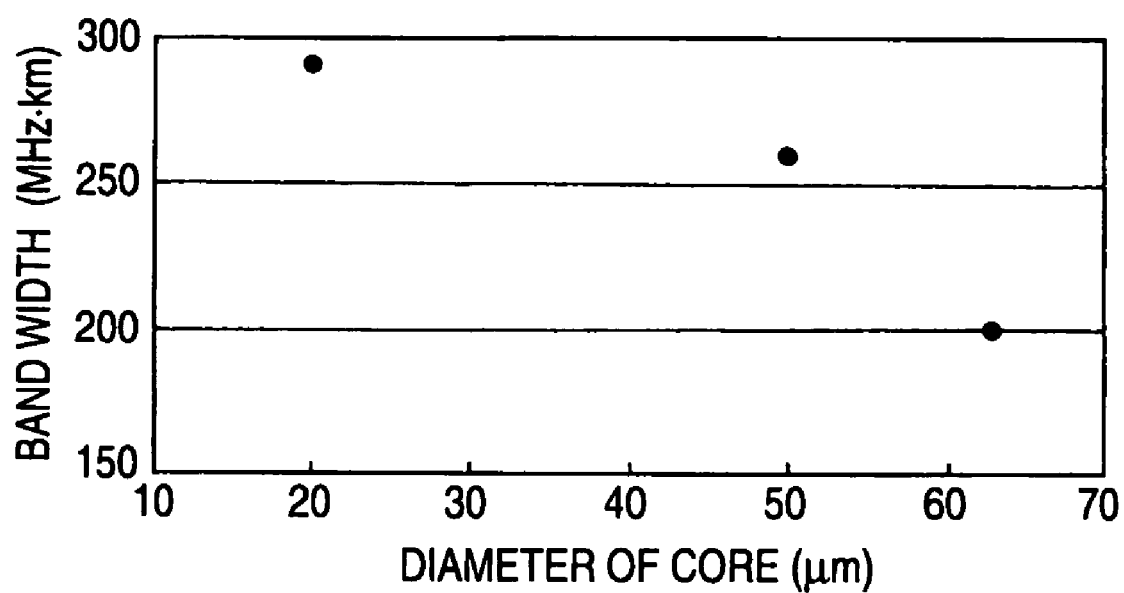
FIG. 28 is a graph showing the relation between the diameter of the core and the bandwidth.

Now, in FIG. 28, a graph is shown in which the diameter of the core is compared with the bandwidth in the example 1, the example 10 and the example 11. The diameter of the core part of the example 1 is 50 µm, the diameter of the core part of the example 10 is 62.5 µm and the diameter of the core part of the example 11 is 20 µm. The examples 1, 10 and 11 respectively have the number M of the layers of the core parts of 3. The refractive index profiles of these examples come into contact with the ideal refractive index profile in the layers respectively. Thus, a degree of approximation to the ideal refractive index profile in these examples is substantially equal.

As shown in FIG. 28, the optical fiber of the example 11 has the largest bandwidth. As apparent from the graph, as the diameter of the core is increased, the bandwidth is liable to be smaller. However, even when the diameter of the core is 62.5 µm, the bandwidth is 200 MHz·km or higher. As the optical fiber for the temperature sensor, the multimode optical fiber of the GI type (the comparative example) having the diameter of the core of 50 µm is ordinarily used from the viewpoints of the diameter of the core, the NA and the attenuation. However, when the connection attenuation can be corrected in the side of the DTS on which the measured light is incident, the diameter of the core can be selected within a range of 20 µm or more and 62.5 µm or less. When the diameter of the core is not larger than 20 µm, the connection attenuation of 60° C. or higher is generated. When the diameter of the core is not smaller than 62.5 µm, the optical fiber is supposed to be affected by the lateral pressure to increase the connection attenuation and deteriorate the temperature measuring accuracy.

Now, an example of a method for producing an optical fiber will be described in which the diameter of a core part is in 50 µm and the number M of layers is 3.

The core part includes glass of a first core layer as a center (a relative refractive index difference relative to pure silica glass: +0.08%), glass of a second core layer located outside the first core layer (a relative refractive index difference relative to pure silica glass: −0.1%) and glass of a third core layer located outside the second core layer (a relative refractive index difference relative to pure silica glass: −0.3%) A cladding part located outside the core part is composed of glass having a relative refractive index difference relative to the pure silica glass of −0.52%. Herein, the relative refractive index difference relative to the pure silica glass is a ratio of the refractive index difference between the refractive indexes of each of the core layers and the pure silica glass with respect to the refractive index of the pure silica glass. In other words, the relative refractive index difference relative to the pure silica glass is calculated by dividing the refractive index difference between the refractive indexes of each of the core layers and the pure silica glass by the refractive index of the pure silica glass. Initially, preforms of the first core layer, the second core layer, the third core layer and the cladding part are separately produced. In all these preforms, glass particles are firstly deposited by a VAD method to produce a porous glass preform. Then, the porous glass preform is heated at 1150° C. in a helium atmosphere including chlorine gas ($Cl_2$) of 4 vol % as a dehydrating agent to perform a dehydrating process.

The porous glass preform may be produced by other method than the VAD method. As the dehydrating agent and an addition agent for adjusting the refractive index, other materials may be employed.

The preform for the first core layer is heated at 1550° C. in the atmosphere of helium of 100% in order to be vitrified after the dehydrating process.

The preform for the second core layer is heated at 1530° C. in the helium atmosphere including silicon tetrafluoride ($SiF_4$) gas of 0.25 vol % for adjusting the refractive index in order to be vitrified after the dehydrating process.

The preform for the third core layer is heated at 1500° C. in the helium atmosphere including silicon tetrafluoride gas of 2.8 vol % for adjusting the refractive index in order to be vitrified after the dehydrating process.

The preform for the cladding part is heated at 1500° C. in the helium atmosphere including silicon tetrafluoride gas of 30 vol % for adjusting the refractive index in order to be vitrified after the dehydrating process.

The transparent glass preform of the first core layer is heated by a resistance heating furnace and drawn to have an outside diameter of 13 mm.

The transparent glass preform of the second core layer is heated by the resistance heating furnace, drawn to have an outside diameter of 28 mm and cooled and then, a hole with a diameter of 17 mm is formed in a center. Then, while surfur hexafluoride ($SF_6$) gas is allowed to flow into the hole, the glass preform is heated at 1200° C. to perform a gas-phase etching and then, the transparent glass preform of the first core layer is inserted into the hole. After that, the glass preform is heated at 1000° C. in an atmosphere of chlorine of 100% to remove impurities. Then, while the pressure of a space between the transparent glass preform of the second core layer and the transparent glass preform of the first core layer is reduced under −4 kPa, the transparent glass preform of the second core layer is heated at 1350° C. to be formed integrally with the transparent glass preform of the first core layer by the rod-in-collapse method. After the obtained body is cooled, the ratios for the first core and the second core are measured by a pre-form analyzer, and an outer periphery of the obtained body is mechanically grinded so as to have a prescribed ratio and an outside diameter of 20 mm.

The transparent glass preform of the third core layer is heated by the resistance heating furnace, drawn to have an outside diameter of 30 mm and cooled and then, a hole with a diameter of 20 mm is formed in a center. Then, while surfur hexafluoride gas is allowed to flow into the hole, the glass preform is heated at 1200° C. to perform a gas-phase etching and then, the transparent glass preform having the first core layer and the second core layer formed integrally is inserted into the hole. After that, the glass preform is heated at 1000° C. in an atmosphere of chlorine of 100% to remove impurities. Then, while the pressure of a space between the transparent glass preform including the first and second core layers and the transparent glass preform of the third core layer is reduced under −4 kPa, the transparent glass preform of the third core layer is heated at 1400° C. to be formed integrally with the transparent glass preform composed of the first and second core layers by the rod-in-collapse method. After the obtained body is cooled, the ratios for the second core layer and the third core layer in the radial direction are measured by a pre-form analyzer and an outer periphery of the obtained body is mechanically grinded so as to have a prescribed ratio and an outside diameter of 25 mm.

The transparent glass preform of the cladding part is heated by the resistance heating furnace, drawn to have an outside diameter of 70 mm and cooled and then, a hole with a diameter of 25 mm is formed in a center. Then, while surfur hexafluoride gas is allowed to flow into the hole, the glass preform is heated at 1200° C. to perform a gas-phase etching and then, the transparent glass preform having the first core layer, the second core layer and the third core layer formed integrally is inserted into the hole. After that, the glass preform is heated at 1000° C. in an atmosphere of chlorine of 100% to remove impurities. Then, while the pressure of a space between the transparent glass preform including the first, second and third core layers and the transparent glass preform of the cladding part is reduced under −4 kPa, the transparent glass preform of the cladding part is heated at 1480° C. to be formed integrally with the transparent glass preform composed of the first, second and third core layers by the rod-in-collapse method. After the obtained body is cooled, the ratios for the third core layer and the cladding part in the radial direction are measured by a pre-form analyzer and an outer periphery of the obtained body is mechanically grinded so as to have a prescribed ratio and an outside diameter of 63 mm.

In accordance with the above-described processes, the glass preform is formed that has the core part composed of three core layers and a prescribed refractive index profile. The process for grinding the outer periphery of the perform, which is performed after the rod-in-collapse method for adjusting the diameter ratio, may be omitted if the conditions of the diameter ratio are good.

The glass preform produced in such a way is drawn by a drawing machine so that the optical fiber having the diameter of glass of 125 μm can be produced.

Now, an example of a method for producing an optical fiber will be described in which the diameter of a core part is in 50 μm and the number M of layers is 5.

The core part includes glass of a first core layer as a center (a relative refractive index difference relative to pure silica glass: +0.08%), glass of a second core layer located outside the first core layer (a relative refractive index difference relative to pure silica glass: −0.4%), glass of a third core layer located outside the second core layer (a relative refractive index difference relative to pure silica glass: −0.16%), glass of a fourth core layer located outside the third core layer (a relative refractive index difference relative to pure silica glass: −0.28%) and glass of a fifth core layer located outside the fourth core layer (a relative refractive index difference relative to pure silica glass: −0.4%) A cladding part located outside the core part is composed of glass having a relative refractive index difference relative to the pure silica glass of −0.47%.

Initially, preforms of the first core layer, the second core layer, the third core layer, the fourth core layer, the fifth core layer and the cladding part are respectively separately produced. In all these preforms, glass particles are firstly deposited by a VAD method to produce a porous glass preform. Then, the glass preform is heated at 1150° C. in a helium atmosphere including chlorine gas ($Cl_2$) of 4 vol % as a dehydrating agent to perform a dehydrating process.

The porous glass preform may be produced by other method than the VAD method. As the dehydrating agent and an addition agent for adjusting the refractive index, other materials may be employed.

The preform for the first core layer is heated at 1550° C. in the atmosphere of helium of 100% in order to be vitrified after the dehydrating process.

The preform for the second core layer is heated at 1530° C. in the helium atmosphere including silicon tetrafluoride ($SiF_4$) gas of 0.03 vol % for adjusting the refractive index in order to be vitrified after the dehydrating process.

The preform for the third core layer is heated at 1530° C. in the helium atmosphere including silicon tetrafluoride gas of 0.6 vol % for adjusting the refractive index in order to be vitrified after the dehydrating process.

The preform for the fourth core layer is heated at 1500° C. in the helium atmosphere including silicon tetrafluoride gas of 3.3 vol % for adjusting the refractive index in order to be vitrified after the dehydrating process.

The preform for the fifth core layer is heated at 1500° C. in the helium atmosphere including silicon tetrafluoride gas of 1.08 vol % for adjusting the refractive index in order to be vitrified after the dehydrating process.

The preform for the cladding part is heated at 1500° C. in the helium atmosphere including silicon tetrafluoride gas of 19 vol % for adjusting the refractive index in order to be vitrified after the dehydrating process.

The transparent glass preform of the first core layer is heated by a resistance heating furnace and drawn to have an outside diameter of 13 mm.

The transparent glass preform of the second core layer is heated by the resistance heating furnace, drawn to have an outside diameter of 28 mm and cooled and then, a hole with a diameter of 13 mm is formed in a center. Then, while surfur hexafluoride ($SF_6$) gas is allowed to flow into the hole, the glass preform is heated at 1200° C. to perform a gas-phase etching and then, the transparent glass preform of the first core layer is inserted into the hole. After that, the glass preform is heated at 1000° C. in an atmosphere of chlorine of 100% to remove impurities. Then, while the pressure of a space between the transparent glass preform of the second core layer and the transparent glass preform of the first core layer is reduced under −4 kPa, the transparent glass preform of the second core layer is heated at 1350° C. to be formed integrally with the transparent glass preform of the first core layer by the rod-in-collapse method. After the obtained body is cooled, the ratios for the first core and the second core are measured by a pre-form analyzer, and an outer periphery of the obtained body is mechanically grinded so as to have a prescribed ratio and an outside diameter of 18 mm.

The transparent glass preform of the third core layer is heated by the resistance heating furnace, drawn to have an outside diameter of 33 mm and cooled and then, a hole with a diameter of 18 mm is formed in a center. Then, while surfur hexafluoride gas is allowed to flow into the hole, the glass preform is heated at 1200° C. to perform a gas-phase etching and then, the transparent glass preform having the first core layer and the second core layer formed integrally is inserted into the hole. After that, the glass preform is heated at 1000° C. in an atmosphere of chlorine of 100% to remove impurities. Then, while the pressure of a space between the transparent glass preform including the first and second core layers and the transparent glass preform of the third core layer is reduced under −4 kPa, the transparent glass preform of the third core layer is heated at 1350° C. to be formed integrally with the transparent glass preform composed of the first and second core layers by the rod-in-collapse method. After the obtained body is cooled, the ratios for the second core layer and the third core layer in the radial direction are measured by a pre-form analyzer and an outer periphery of the obtained body is mechanically grinded so as to have a prescribed ratio and an outside diameter of 22 mm.

The transparent glass preform of the fourth core layer is heated by the resistance heating furnace, drawn to have an outside diameter of 37 mm and cooled and then, a hole with a diameter of 22 mm is formed in a center. Then, while surfur hexafluoride gas is allowed to flow into the hole, the glass preform is heated at 1200° C. to perform a gas-phase etching and then, the transparent glass preform having the first core layer, the second core layer and the third core layer formed integrally is inserted into the hole. After that, the glass preform is heated at 1000° C. in an atmosphere of chlorine of 100% to remove impurities. Then, while the pressure of a space between the transparent glass preform including the first and second and third core layers and the transparent glass preform of the fourth core layer is reduced under −4 kPa, the transparent glass preform of the fourth core layer is heated at 1350° C. to be formed integrally with the transparent glass preform composed of the first and second and third core layers by the rod-in-collapse method. After the obtained body is cooled, the ratios for the third core layer and the fourth core layer in the radial direction are measured by a pre-form analyzer and an outer periphery of the obtained body is mechanically grinded so as to have a prescribed ratio and an outside diameter of 26 mm.

The transparent glass preform of the fifth core layer is heated by the resistance heating furnace, drawn to have an outside diameter of 40 mm and cooled and then, a hole with a diameter of 26 mm is formed in a center. Then, while surfur hexafluoride gas is allowed to flow into the hole, the glass preform is heated at 1200° C. to perform a gas-phase etching and then, the transparent glass preform having the first core layer, the second core layer, the third core layer and the fourth core layer formed integrally is inserted into the hole. After that, the glass preform is heated at 1000° C. in an atmosphere of chlorine of 100% to remove impurities. Then, while the pressure of a space between the transparent glass preform including the first, second, third and fourth core layers and the transparent glass preform of the fifth core layer is reduced under −4 kPa, the transparent glass preform of the fifth core layer is heated at 1350° C. to be formed integrally with the transparent glass preform composed of the first, second, third and fourth core layers by the rod-in-collapse method. After the obtained body is cooled, the ratios for the fourth core layer and the fifth core layer in the radial direction are measured by a pre-form analyzer and an outer periphery of the obtained body is mechanically grinded so as to have a prescribed ratio and an outside diameter of 29 mm.

The transparent glass preform of the cladding part is heated by the resistance heating furnace, drawn to have an outside diameter of 69 mm and cooled and then, a hole with a diameter of 29 mm is formed in a center. Then, while surfur hexafluoride gas is allowed to flow into the hole, the glass preform is heated at 1200° C. to perform a gas-phase etching and then, the transparent glass preform having the first, second, third, fourth and fifth core layers formed integrally is inserted into the hole. After that, the glass preform is heated at 1000° C. in an atmosphere of chlorine of 100% to remove impurities. Then, while the pressure of a space between the transparent glass preform including the first, second, third, fourth and fifth core layers and the transparent glass preform of the cladding part is reduced under −4 kPa, the transparent glass preform of the cladding part is heated at 1480° C. to be formed integrally with the transparent glass preform composed of the first, second, third, fourth and fifth core layers by the rod-in-collapse method. After the obtained body is cooled, the ratios for the fifth core layer and the cladding part in the radial direction are measured by a pre-form analyzer and an outer periphery of the obtained body is mechanically grinded so as to have a prescribed ratio and an outside diameter of 63 mm.

In accordance with the above-described processes, the glass preform is formed that has the core part composed of five core layers and a prescribed refractive index profile. The process for grinding the outer periphery of the perform, which is performed after the rod-in-collapse method for adjusting the diameter ratio, may be omitted if the conditions of the diameter ratio are good.

The glass preform produced in such a way is drawn by a drawing machine so that the optical fiber having a diameter of glass of 125 µm can be produced.

Now, an example of a method for producing an optical fiber will be described that has any of the number M of layers of a core part of 6 to 20.

Initially, a glass pipe composed of silica glass including fluorine is prepared. The outside diameter of the glass pipe is 34 mm and the thickness thereof is 4 mm.

Then, a below-described depositing process, a fluorine diffusing process and a consolidating process are repeatedly carried out for the number M of the layers of the core part.

(Depositing Process)

Firstly, silicon tetrafluoride of 1000 cc/minute, oxygen of 1850 cc/minute and helium of 1000 cc/minute are introduced into the glass pipe. Then, the temperature of a heat source is raised to heat the glass pipe at heating temperature of 1500° C. or higher. Then, the heat source is allowed to traverse from one end side to the other end side of the glass pipe. When the heat source is allowed to traverse in the longitudinal direction of the glass pipe under a state that a glass material gas is introduced into the glass pipe, silicon tetrafluoride is oxidized inside the glass pipe in a heated area and thus glass particles (called soot) of the silica glass ($SiO_2$) are produced. Then, the glass particles adhere to and are deposited in the inner part of the glass pipe in a downstream side of a flow of the glass material gas in accordance with a thermophoresis effect. Then, in the inner part of the glass pipe, a layer of a porous glass particles deposit is formed by a deposition (referred to as sooting) of the glass particles. The deposition speed of the glass particles by sooting is set to 0.8 g/minute and the bulk density of the glass particles deposit is set to 0.2 g/cm$^3$.

(Fluorine Diffusing Process)

After the glass particles are deposited and the heat source is allowed to traverse to the other end side of the glass pipe, the temperature of the heat source is lowered to such a temperature (for instance, temperature at which the surface temperature of the glass pipe reaches about 500° C.) so as not to vitrify the glass particles inside the glass pipe.

Silicon tetrafluoride ($SiF_4$) and helium gas are respectively introduced into the glass pipe by adjusting the flow rate thereof. Then, the heat source whose temperature is lowered is allowed to traverse from the other end side to the one end side. Thus, the silicon tetrafluoride introduced into the glass pipe is heated to be separated into fluorine and silicon. The separated fluorine enters the porous glass particles deposit. At this time, chlorine included when the glass particles deposit is formed is replaced by fluorine to be expelled outside the glass particles deposit.

When the layer (the outermost layer of the core part) having the relative refractive index difference relative to the pure silica glass of −0.7% is formed, the flow rate of silicon tetrafluoride is set to 1000 cc/minute and helium is not allowed to flow in the fluorine diffusing process. When the layer (the innermost layer of the core part) at the center of the core is formed, the silicon tetrafluoride is not allowed to flow and the flow rate of helium is set to 1000 cc/minute. In the layers between outermost and innermost layers, both the silicon tetrafluoride and helium are allowed to flow so as to meet required refractive indexes.

(Consolidating Process)

While gas including the silicon tetrafluoride is introduced (or only helium gas is introduced), the temperature of the heat source is raised to such a temperature as to vitrify the glass particles deposit (for instance, a temperature at which the surface temperature of the glass pipe reaches about 2000° C.). Then, the heat source is allowed to traverse in the longitudinal direction of the glass pipe. Thus, the glass particles deposit is vitrified in an atmosphere of fluorine gas and thus a glass layer including fluorine is formed.

In the depositing process, when the flow rate of the silicon tetrafluoride is low (less than 500 cc/minute), the layer of the formed glass particles deposit tends to be too thin, so that fluorine is hardly added with high concentration.

Further, when the heating temperature of the glass pipe is too high (the surface temperature of the glass pipe exceeds 1850° C.) in the depositing process, the bulk density of the formed glass particles deposit is too high. Thus, fluorine is hardly added with high concentration.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. A multimode optical fiber for fiber-optic distributed temperature sensing (DTS), comprising:
   a core part; and
   a cladding part,
   wherein the core part has a structure including a plurality of concentric layers in which a refractive index changes stepwise so as to be higher toward a central area, and a quantity of addition of fluorine to silica glass of the core part is adjusted so as to be entirely increased toward an outer layer,
   wherein the number M of the layers of the core part is located within a range of $3 \leq M \leq 20$ and
   wherein the refractive index of the entire core is greater than the refractive index of the cladding layer.

2. The multimode optical fiber according to claim 1, wherein in a refractive index profile of the core part, when the central part and an end part in a radial direction of the core part are allowed to satisfy a below-described expression (1) as an ideal refractive index profile, the refractive index of at least one layer except a central layer of the layers corresponds to the ideal refractive index profile of the expression (1):

$$n(r)=n1\{1-2\Delta(r/a)^\alpha\}^{1/2}, 2.0 \leq \alpha \leq 2.1 \quad (1)$$

wherein n designates a refractive index difference, n1 designates a refractive index of the center of the core, $\Delta$ designates a relative refractive index difference, a designates a radius of the core, r designates a distance from the center of the core and a designates a coefficient of refractive index profile.

3. The multimode optical fiber according to claim 2, wherein the refractive index of all the layers of the core part correspond to the ideal refractive index profile of the expression (1).

4. The multimode optical fiber according to claim 1, wherein a numerical aperture NA is not lower than 0.18.

5. The multimode optical fiber according to claim 1, wherein a bandwidth is not lower than 200 MHz·km.

6. The multimode optical fiber according to claim 1, wherein the increase of attenuation is not higher than 0.2 dB/km in a wavelength area of a range not lower than 800 nm and not higher than 1700 nm after the elapse of 300 hours in an atmosphere of hydrogen of 2 atm and under an environment of 150° C.

7. The multimode optical fiber according to claim 6, wherein a bandwidth is not lower than 200 MHz·km.

8. The multimode optical fiber according to claim 6, wherein a numerical aperture NA is not lower than 0.18.

* * * * *